United States Patent [19]

Rasch et al.

[11] Patent Number: 5,802,222

[45] Date of Patent: Sep. 1, 1998

[54] COLOR IMAGE GENERATION SYSTEMS AND APPLICATIONS

[75] Inventors: Andreas Rasch; Matthias Rottschalk; Jens-Peter Ruske; Volker Groeber, all of Jena, Germany

[73] Assignee: LDT Gmb&H Co. Laser-Display-Technologie KG, Gera, Germany

[21] Appl. No.: 718,357

[22] PCT Filed: Feb. 6, 1996

[86] PCT No.: PCT/EP96/00494

§ 371 Date: Oct. 3, 1996

§ 102(e) Date: Oct. 3, 1996

[87] PCT Pub. No.: WO96/25009

PCT Pub. Date: Aug. 15, 1996

[30] Foreign Application Priority Data

Feb. 7, 1995 [DE] Germany .................... 195 03 929.7

[51] Int. Cl.$^6$ ............................................. G02B 6/10
[52] U.S. Cl. ............................ 385/1; 385/45; 385/14; 385/2; 385/8; 385/9
[58] Field of Search ............................ 385/14, 45, 2, 385/3, 4, 5, 6, 7, 8, 9, 10, 907

[56] References Cited

U.S. PATENT DOCUMENTS

| 4,871,231 | 10/1989 | Garcia, Jr. ............... 359/478 |
|---|---|---|
| 4,940,303 | 7/1990 | Abeles et al. ............ 350/96.11 |
| 5,614,961 | 3/1997 | Gibeau et al. ............ 348/750 |

FOREIGN PATENT DOCUMENTS

| A0107091 | 5/1984 | Germany . |
|---|---|---|
| A9012387 WO | 10/1990 | Germany . |
| A9112556 WO | 8/1991 | Germany . |
| A9320657 WO | 10/1993 | Germany . |
| A9409472 WO | 4/1994 | Germany . |
| A9503675 | 2/1995 | WIPO . |

*Primary Examiner*—John Ngo
*Attorney, Agent, or Firm*—McAulay Fisher Nissen Goldberg & Kiel, LLP

[57] ABSTRACT

Color image generation systems are disclosed for the reproduction of real or virtual, two-dimenional or three-dimensional, color, or monochrome images and their applications, in particular for television or video applications, and printing applications. Integrated-optical structures are used on a mount, in particular a substrate. An image is generated by deflecting color light beams generated into a viewing space, which deflection is effected in synchronism with color setting and intensity- or amplitude modulation of the light. All electronic and optical assemblies for color image generation may be integrated on a mount either monolithically or in hybrid fashion. The color generation system may be implemented as an encased module.

25 Claims, 18 Drawing Sheets

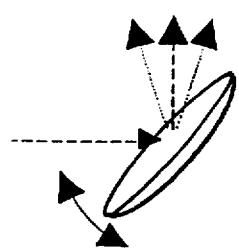
F I G. 20a
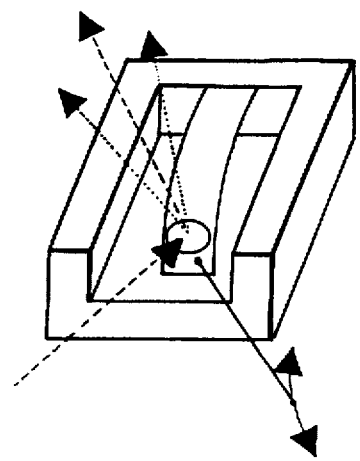
F I G. 20b
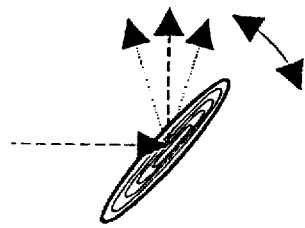
F I G. 20c
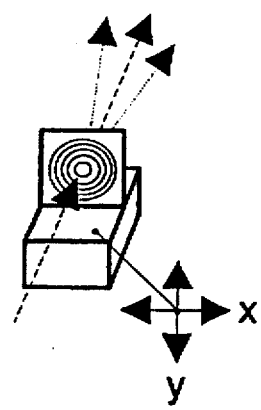
F I G. 20d
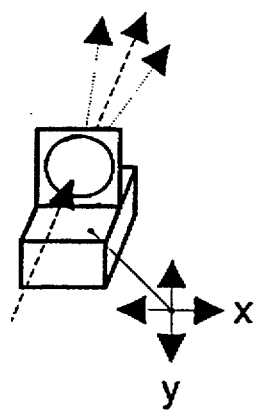
F I G. 20e
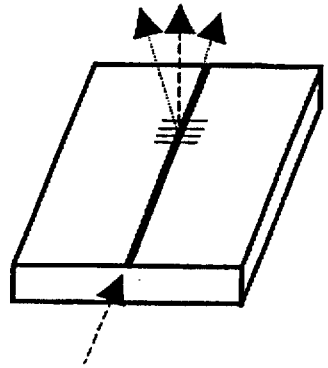
F I G. 20f
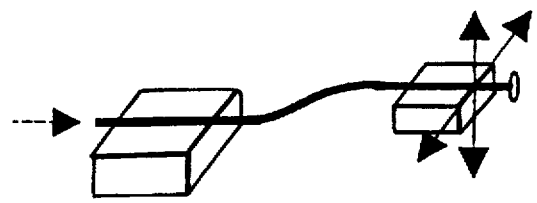
F I G. 20g

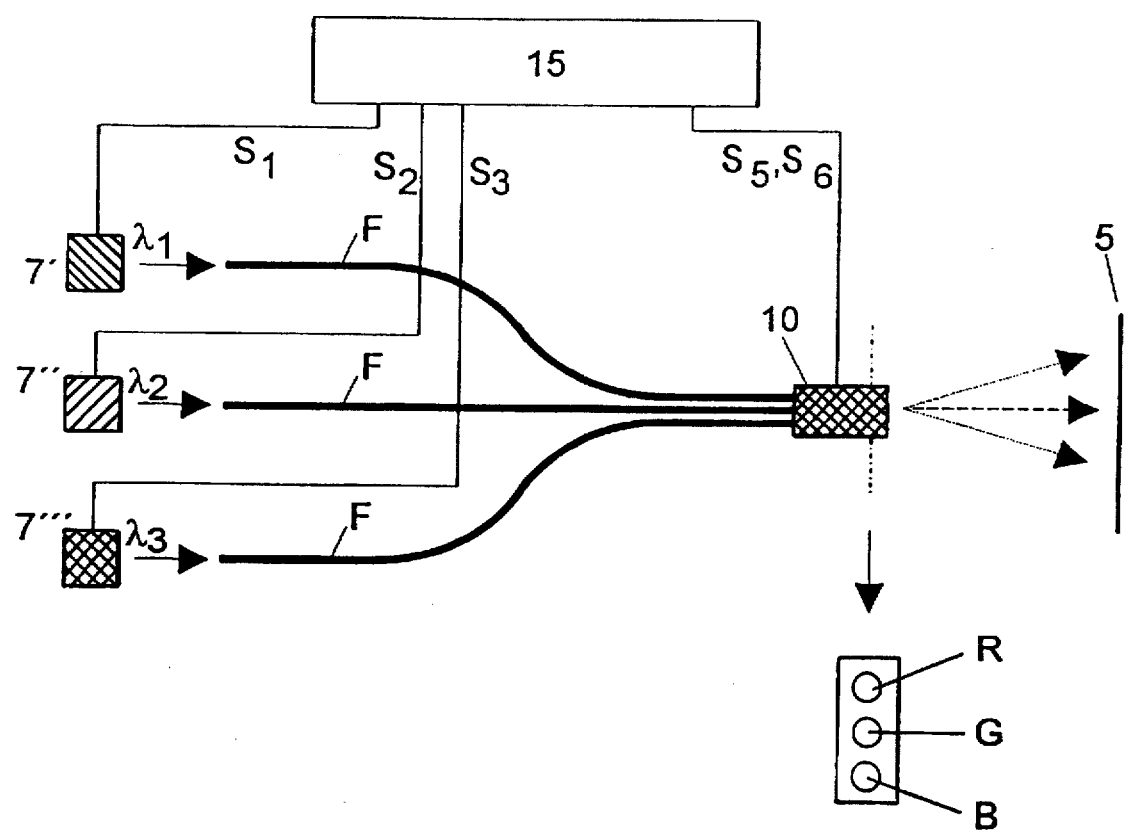
F I G. 26

COLOR IMAGE GENERATION SYSTEMS AND APPLICATIONS

BACKGROUND OF THE INVENTION a) Field of the Invention

The invention relates to color image generation systems for the reproduction of real or virtual two-dimensional or three-dimensional, color or monochrome images and applications of color image generation systems, in particular for television or video applications, and in printing technology.

b) Description of the Related Art

The color image generation systems use the physiological capacity of the human eye, on the one hand, to perceive several colors as a mixed color (additive color mixing) and, on the other hand, to perceive as an image individual points of light presented tightly clustered and in rapid temporal succession. For the purposes of this document, light refers to discrete wavelengths ($\lambda$) or wavelength ranges ($\Delta\lambda$) of visible electromagnetic radiation, in particular in the wavelength range from 400 nm to 760 nm. Preferably, the wavelengths or wavelength ranges are selected which correspond to the red, green and blue lights (basic colors). For the purposes of this document, light here also means invisible electromagnetic radiation if it is converted into visible light on a screen by means of a luminophore or by means of a non-linear optical device.

A modern method for mixing color and generating a television or video image has been implemented using light valve technology on the basis of various physical effects (R. Gerhard-Multhaupt and H. Röder: "LichtventilGroßbildprojektion: Eine Übersicht" (Light valve large image projection: an overview), Fernseh- und Kino-Technik, 45(9) pages 448–452 (1991)).

An image generation system for the creation of color images of any size is revealed in patent application DE 31 52 020 A1 in which the light from three laser diodes is directed into three light guide tubes, the tubes being bundled into an optical fiber tube bundle, and the end of the optical fiber tube bundle being provided with a magnetic cladding. The magnetic cladding can be deflected horizontally and vertically in a variable magnetic field. This is followed by an projection optical system and at least one deflecting mirror, by means of which the light beams are deflected onto a ground glass screen which is either free of luminophores or is coated with luminophores luminescing in the basic colors. This image generation system generates color images using known assemblies which cannot be easily made by means of micro-optics and/or micro-mechanics. There is no spatial combination of light components in the optical fibers. The optical fibers which transmit the individual color components are gathered together in a bundle and the fiber ends are arranged in a tight cluster (see FIG. 26).

In patent application DE 43 24 848 C1, a color image projection system is described which comprises two assemblies. The assembly for light generation and light modulation contains three laser light sources. Using volume-optical amplitude modulators, e.g. Pockels cells, the three light components will be selectively intensity- or amplitude-modulated, and then combined by means of mirrors. This color- and intensity-modulated light will be transmitted into the assembly for column and line deflection for the projection and written into space in synchronism with the modulation.

This patent application also describes that several individual optical fibers can be spatially combined such that they will be continued in a united optical fiber harness. This creates an optical fiber coupler which is capable of effectively transmitting the wide spectrum range of visible light. The optical fibers only serve as light transmission devices providing the connection between the two spatially separated components: light generation and light modulation assembly, and column and line deflection assembly for the projection.

OBJECT AND SUMMARY OF THE INVENTION

The primary object of the invention is to solve the problem of creating comparably small and simply constructed, as well as universally usable, color image generation systems for generating real or virtual images, which color image generation systems feature improved characteristics, such as a higher image resolution or a more comprehensive color spectrum, and thus enable new applications in basically known systems.

The arrangement is intended to generate, and write into space, an intensity- or amplitude-modulated as well as color-modulated color signal, in particular for the generation of a two-dimensional or three-dimensional television or video image, or a printed image.

The purpose of the invention is, in the most extreme embodiment of the invention, to integrate all electronic and optical components of a color image generation system on one mount and to provide this as a module with electrical connections and an optical output.

The object of the invention is achieved in a color image generation system comprising at least one light source for emitting light of at least one wavelength or one wavelength range, at least one optical waveguide responsive to said light emitted by the light source, at least one controllable modulation device, means for beam shaping and beam deflection and one control unit coupled to the at least one controllable modulation device for controlling at least one of intensity- or amplitude modulation and color modulation of the light as well as to the means for beam shaping and beam deflection. The means for beam shaping and beam deflection by which the at least one of intensity- or amplitude modulated and color modulated light is adapted to being deflected in at least one spatial direction using the control unit in synchronism with modulation control, and an image field are adapted to being written to in digital fashion (light points) or in analog fashion (light beam). Between the at least one light source and the means for beam shaping and beam deflection, a mount is arranged on which at least one optical waveguide is mounted such that a minimum of one optical waveguide capable of transmitting efficiently the wavelengths or wavelength ranges according to a predetermined application injects intensity- or amplitude modulated and/or color modulated light into the means for beam shaping and beam deflection.

The object is successfully achieved by using integrated-optical components (optical waveguide and waveguide devices) for light splitting, light combination, light modulation and/or wavelength filtering, arranged on a mount.

The fundamental idea is—in a first case, —to use a waveguide structure here designated as a 'unit for the spatial combination of beams' for combining the components of light of different discrete wavelengths or different wavelength ranges (basic colors). The spatially combined light will be deflected such that, thanks to the synchronous modulation of the light components used to deflect the combined light, a virtual image is created in the viewing space or a real image is created on a projection screen, which can be perceived by the eye of the observer.

Color generation is effected by additive color mixing of light components of different wavelengths at the combination point of the waveguides, hereinafter designated as the coupling point, in the unit for the spatial combination of beams, where, independently of each other, the light components will be intensity- or amplitude-modulated either before or within the unit for the spatial combination of beams.

In a second case, the invention assumes that spectral light components of light from a wide wavelength range, guided in a wideband waveguide, which wavelength range corresponds to the wavelength range of white light in particular, can be filtered out. Here, color generation is effected by subtractive color mixing. If white light is used, the color of the decoupled light corresponds to the complementary color of the wavelength range filtered out. To generate a full color image, three different color light components generated as described above (basic colors) will be required.

In a first variant, these can be generated simultaneously by means of three different filter elements. The light of the wide wavelength range, coupled into the waveguide structure, will then need to be distributed by means of a wideband distributor structure to the individual filter elements. Following intensity- or amplitude modulation of the three light components generated, these will be combined in a "unit for the spatial combination of beams" and can be decoupled into the unit for beam shaping and beam deflection.

In a second variant, a controllable filter element is used, which will filter out a selectable wavelength range from the light guided in the waveguide. If white light is used, the color of the decoupled light corresponds to the complementary color of the wavelength range filtered out.

By means of a controllable filter element arranged in a single waveguide, the three different color light components (basic colors) can be time division multiplex generated, intensity- or amplitude-modulated, and decoupled. With a sufficiently high repetition frequency of the color generation, the impression of a color image can be generated. If a controllable filter element is used, but time division multiplex operation is not employed, the available color range will be restricted but sufficient for many applications. For instance, an integrated-electrooptical Mach-Zehnder-interferometer modulator from single-mode integrated-optical wideband channel waveguides (SOWCW or white light waveguides) thus represents a controllable filter element. Due to the wavelength dependency of its half-wave voltage, this is capable of filtering out various wavelength ranges from the light guided in the waveguide before the interferometer by applying different voltages.

With suitable filter elements, it is possible to set selected color values within the spectrum of visible light. By means of the deflection into the viewing space, effected in synchronism with color value setting and intensity- or amplitude modulation of the light, a color image which may contain all color values is generated by additive color mixing.

The following descriptions apply mutatis mutandis to both above-mentioned cases, excepting only the explanations relating to the "unit for the spatial combination of beams".

With respect to the above-mentioned first case of additive color mixing, in this description the "unit for the spatial combination of beams" refers to an assembly of waveguides capable of transmitting and combining in space the wideband light, or light in selected spectral ranges, effectively.

The waveguides are integrated-optical channel waveguides, optical fibers, or quasi waveguides.

Quasi waveguides are refractive index arrangements in strip layout, whose functional principle is not based on the total reflection principle but on other reflection principles, e.g. resonant and anti-resonant Fabry-Perot reflection (ARROW), or on strong reflection for large refractive index decreases in the light guiding range. At least the common optical waveguide just after the coupling point—when viewed in the direction of the light—must be wideband. In this context, wideband means that light from the entire visible wavelength range, but at least from all used wavelengths, can be guided through the waveguide, or that the waveguides have the characteristic of effectively guiding light of different discrete wavelengths, in particular those from the spectrum of visible light, in this single waveguide. Arranging in a suitable way a number of waveguides allows the combination in space of light in a common wideband waveguide in a simple fashion. It is fundamentally true that if the light components are modulated outside the waveguide there is no restriction in respect of the number of modes guided in the waveguide. But single-mode waveguides are necessary, if the principle of modulation used requires single-mode, e.g. if intensity- or amplitude modulators on the basis of integrated-optical interferometer structures are used.

Thus, for instance, single-mode will not be mandatorily required in the case of cut-off modulation, electroabsorption modulation, and polarization modulation in connection with a polarizer or a polarizing waveguide.

The light components may be intensity- or amplitude-modulated and/or switched in the color image generation system at the following points: either when they are generated by controlling the light source and/or between the light source and the spatial beam combination unit with external modulators, and/or within the unit for the spatial combination of the beam in at least one waveguide, and/or at the coupling point for the waveguide, and/or following the coupling point—but here only for time division multiplex operation of the light sources. The at least two different light components are modulated in their intensity or amplitude and spatially combined at one coupling point, at least, to set a color value. Time-multiplexed transmission of the individual light components is possible because of the very high possible modulation frequency for influencing the light components to provide for a flicker-free image reproduction.

Thus, spatial combination and projection of the at least two different light components should in a first case be implemented simultaneously or, in a second case, consecutively (time-multiplexed). The image reproduction or projection is done by using a unit for beam shaping and deflection, with the projection of a pixel or an image line or of the entire image being executed in very rapid sequence in the basic colors suitable for the generation of color, for instance in red, in green and in blue. The eye "adds up" a color image from the individual monochrome pixels or image lines or images.

In a first variant, at least two individual optical fibers are joined together spatially in such a way that the light is continued in a combined optical fiber line.

An optical fiber coupler, which is capable of transmitting efficiently the wide spectral range of visible light, is created. Here, the fibers not only provide a spatial link between the light sources and the beam deflection system. They also form a unit for spatial combination of the beam on one carrier, which unit corresponds with at least two light sources and the unit for beam shaping and beam deflection.

In a second variant, at least one integrated-optical channel waveguide coupler is used to transmit the light and to combine the light components. These couplers are capable of transmitting and concentrating the wavelength spectrum of visible light with a high degree of efficiency, for instance.

At least two channel waveguides are combined and form a common third channel waveguide for the onward transmission of the light components which have been combined in space.

In the event of the intention to provide intensity- or amplitude modulation of the light components guided in the waveguides, it is appropriate to construct the channel waveguide coupler, if necessary, at least in part from wideband channel waveguides, guiding the light in single-mode in the entire spectral range to be transmitted or modulated. These will be designated as single-mode integrated-optical wideband channel waveguides (SOWCW).

Single-mode will be mandatorily required in those wavelength ranges only where such an integrated-optical intensity- or amplitude modulator is located whose function demands the single-mode characteristic. In the other wavelength ranges, e.g. in the range of the combined light components (compare, for instance, in FIG. 10 the common wideband channel waveguide 9) the single-mode characteristic will not be necessary. If it is necessary, that the single waveguides have to be single-mode but the light sources corresponding to these single waveguides each emit light of a bandwidth that does not require the use of wideband channel waveguides (e.g. laser light sources), then single-mode narrow-band waveguides may also be used as single waveguides. It is only the common optical waveguide which must necessarily be wideband. If suitably dimensioned, multimode waveguides are always optically wideband.

The single-mode integrated-optical wideband channel waveguides and single-mode white light waveguides are the subject of the patent application "Channel Waveguide and Applications" submitted on the same day. The single-mode integrated-optical wideband channel waveguide couplers and single-mode white light channel waveguide couplers are the subject of the patent application "Junction Splitters consisting of Channel Waveguides and Applications" submitted on the same day.

In a third variant, wideband quasi-waveguide couplers (e.g. ARROW couplers) are used for the transmission of light and the spatial combination of the light components.

It can be demonstrated that quasi-waveguides can be dimensioned such that, technically viewed, they are capable of effectively transmitting discrete wavelength ranges from the spectrum of visible light.

With the three waveguide variants described above, it is in principle possible to implement coupling points as Y-junction couplers, directional couplers, three-guide couplers, BOA or X-couplers or using reflectors. The practical implementation of a concrete embodiment is, however, dependent on current technical capabilities and the technical parameters achievable.

A Y-junction coupler is generally a passive component which can only be switched to a seriously limited degree. In the event that the waveguide connected to the Y-junction coupler is single-mode, or in the event of extreme multimodality (more than around 50 modes), the Y-junction coupler has a good and stable divider ratio (1:1) in its splitter function. In combining operation, the Y-junction couplers show a loss of 3 dB in the event of the optical waveguides connected to the Y-junction coupler being single-mode and in the event of light input coupling into just one input waveguide.

Directional couplers and three-guide couplers have an advantageously realizable switching characteristic which can be electro-optically implemented, e.g. the coupling characteristics are heavily dependent on the wavelength, which fact can be advantageously exploited for the spatial combination and modulation of light for the purposes of color mixing. The switching voltages are 5 to 20 volts for an effective electrode length L in the millimeter range, and an electrode spacing d in the micrometer range in the event of the use of substrate materials such as potassium titanyl phosphate ($KTiOPO_4$, KTP) or lithium niobate ($LiNbO_3$).

BOA is a French language designation (bifurcation optique active) for a group of integrated-optical devices (see: M. Papuchon, A. Roy, D. B. Ostrowsky, "*Electrically active optical bifurcation: BOA*", Appl. Phys. Lett., Vol. 31 (1977) pp. 266–267). BOA also have an electro-optically implemented switching characteristic, for instance, which can be advantageously exploited. Simple electrode structures are possible. The coupling characteristics of BOA are heavily wavelength dependent, which fact can be advantageously exploited for color mixing purposes. The switching voltages are 10 to 20 volts in KTP or $LiNbO_3$.

An X-coupler has characteristics similar to those of a BOA, but because of its short interaction length it demands substantially higher switching voltages (typically 50 volts).

Integrated-optical or microoptical reflectors are mounted in or on a substrate material in the form of prisms, mirrors or gratings and couple together two channel waveguides.

The light sources used are cw- (continuous wave) or pulsed lasers or laser diodes or optical fiber lasers or luminescence diodes or spectral lamps, each being preferably capable of emitting light in the wavelengths of red, green and blue light.

Because the availability of miniaturized narrow-band light sources emitting green and blue light is restricted by the current state of the art, the principle of the generation of the second harmonic may be applied to transform infrared radiated light into the spectral range required.

Pumping light of sufficient power is capable of generating light of half the wavelength due to non-linear optical effects in arrangements on the basis of suitable materials; thus, for example, the infrared laser diode light with a wavelength of 830 nm is transformed into light with a wavelength of 415 nm (generation of the second harmonic). In addition, higher harmonics, sum and difference frequencies of the light can be generated. The color image generation system contains at least two independently controllable modulation devices to convert an appropriate, generally electrical, input signal into an optical intensity- or amplitude modulated and color modulated output signal. Only one modulation device is necessary for generating a monochrome image. The modulation devices enable separate active control of the light from one or more light sources up to very high control frequencies (into the GHz range in accordance with the current state of the art). For the purposes of color image generation, the light from at least one light source must be capable of being intensity- or amplitude modulated synchronously with the deflection of the light beams.

In a first variant, intensity- or amplitude modulation of the light is implemented by modulation of the luminous efficiency of the light source.

In a second variant, intensity- or amplitude modulation of the light is implemented between light source and optical waveguide in an external intensity- or amplitude modulator.

In a third variant, intensity- or amplitude modulation of the light is implemented in the minimum of one optical waveguide before the spatial combination of the light components. If required by the principle of intensity-or amplitude modulation, the optical waveguide must be single-mode. Whether a single-mode integrated-optical wideband channel waveguide is to be used, will depend on the bandwidth of the light source.

The coupling point connected to the input waveguides, and the common optical waveguide, must feature a bandwidth which allows all wavelengths and wavelength ranges in use to be guided.

In a fourth variant, the intensity- or amplitude modulation of the light is implemented in a controllable coupling point of the waveguide. If required by the principle of intensity or amplitude modulation in the coupling point, the optical waveguides, which the coupling point is made up of, must be single-mode or feature a number of modes corresponding to the functional principle (e.g. in respect of the principle of two-mode interference). Whether single-mode integrated-optical wideband channel waveguides (SOWCW) are to be used, will be dependent on the bandwidth of the light sources. The common optical waveguide connected to the coupling point must feature a bandwidth enabling guidance of all wavelengths or wavelength ranges in use, but need not mandatorily be single-mode.

In a fifth variant, the intensity- or amplitude modulation of the light components available consecutively over time after the coupling point (e.g. in time-multiplexed operation of the light sources) is implemented in time-multiplexed operation in the common optical waveguide in which the light components are spatially combined. This common optical waveguide must feature a bandwidth enabling guidance of all wavelengths or wavelength ranges in use. If required by the principle of intensity- or amplitude modulation, the common optical waveguide must be single-mode, that is, a single-mode integrated-optical wideband channel waveguide (SOWCW), if necessary.

In a sixth variant, the intensity- or amplitude modulation of the light components available consecutively over time after the common optical waveguide (e.g. in time-multiplexed operation of the light sources) is implemented in time-multiplexed operation in an intensity- or amplitude modulator at a suitable point after the integrated-optical structure, for instance between the output of the common optical waveguide and the unit for beam shaping and beam deflection.

The intensity- or amplitude modulation of the light is implemented in accordance with one of the following principles:

electro-optical, acousto-optical, thermo-optical, magneto-optical, opto-optical, photo-thermal modulation, modification of the effective refractive index by injection or depletion of free charge carriers in semiconductor materials, electro-optical, acousto-optical, thermo-optical, magneto-optical, opto-optical, or photo-thermal modulation using the Fabry-Perot effect, modulation by changing the effective refractive index by means of injection or depletion of free charge carriers in semiconductor materials, using the Fabry-Perot effect, electro-optical, acousto-optical, thermo-optical, magneto-optical, opto-optical, or photo-thermal cut-off modulation, cut-off modulation on the basis of the change in the effective refractive index as a result of the injection or depletion of the free charge carriers in semiconductor materials, controllable waveguide amplification, controllable polarization conversion in connection with a polarizer, waveguide mode conversion, electro-absorption modulation, modulation with the assistance of an integrated-optical switching or distributor element, such as an X-coupler, three-guide coupler, directional coupler or BOA, modulation of the light source itself, modulation by modifying the coupling efficiency between light-source and waveguide, or modulation by radiation attenuators, such as controllable apertures or absorbers mounted after the light source.

For intensity- or amplitude modulation within the optical waveguide, or outside the optical waveguide, suitable principles are to be selected. If necessary, intensity- or amplitude modulation will be effected on the basis of integrated-optical interferometer structures, making advantageous use of the above-mentioned modulation processes.

The invention also relates to integrated-optical implementation variants of the unit for the spatial combination of beams, in which the coupling point of two wideband waveguides can actively be influenced, i.e. controlled. The controllable coupling point takes the form of controllable spatial combination of beams and/or controllable guidance of beams, as required.

The controllable coupler operates on the principle of two-mode interference as an X-coupler, directional coupler, three-guide coupler, or BOA.

The invention also relates to an arrangement of intersecting optical waveguides, in particular single-mode integrated-optical channel waveguides in which the intersection points form a matrix. The intersection points are a) fully passive (passive waveguide intersections) or b) passive coupling points for the spatial combination of light components, or c) controllable coupling points for the modulation and spatial combination of beams and/or guidance of beams. In principle, light components can be coupled into each waveguide.

In a first variant, three waveguides are mounted in parallel for the three light components of different wavelengths, these are intersecting a further waveguide, with the intersection points being passive coupling points for the spatial combination of the beams. Intensity- or amplitude modulation may be achieved through the light sources or intensity- or amplitude modulation is implemented in each of the three single-mode waveguides. An intensity- or amplitude modulator is mounted on each of the single-mode waveguides for the purposes of intensity- or amplitude modulation in the single-mode waveguides. In the case of controllable coupling points, the intensity- or amplitude modulation is implemented within the intersection points of the single-mode waveguides. In every case, intensity- or amplitude-modulated, and colormodulated, spatially combined light may be fed out at the output of the common waveguide.

In a second variant, two waveguides are provided mounted in parallel for two light components, these intersect a further waveguide. Light of a third wavelength may be coupled into an input of the common waveguide. Here the intersection points are coupling points for the spatial combination of beams and a) the light sources may be intensity- or amplitude modulated and the coupling points are passive, or b) an intensity- or amplitude modulator is arranged on each of the three single-mode waveguides and the coupling points are passive, or c) the intersection points of the single-mode waveguides are controllable coupling points for the spatial combination and/or guidance of beams. In every case, intensity- or amplitude-modulated, and color-modulated, spatially combined light may be fed out at the output of the common waveguide.

In a third variant, the three light components can be coupled into three waveguides arranged in parallel. These three waveguides intersect three further waveguides and a fourth common waveguide, with the intersection points of the waveguides being, depending on the design, controllable coupling points, passive coupling points, or fully passive waveguide intersection points. The three further waveguides, that are intersected, have blind outputs from which unused light components may be fed out. The intensity- or amplitude modulated, and color-modulated, spatially combined light may be fed out at the output of the fourth, common waveguide.

By combination and adaptation of the principles described here larger matrix arrangements may also be implemented.

Each of the embodiments of the unit for the spatial combination of beams described here couples from its output intensity- or amplitude modulated, and color-modulated, spatially combined light into a unit for beam shaping and beam deflection. This comprises a separate beam shaping device and a separate beam deflection device or a function-integrating assembly implementing both functions. The beam shaping and beam deflection functions may be addressed individually or jointly by the control unit. By means of the beam shaping device the light fed out from the unit for the spatial combination of beams, generally in collimated form, will be directed onto a projection surface or into viewing space. By means of the unit for the deflection of beams, the light beam fed out and shaped will be fed in synchronism with intensity- or amplitude modulation, and color modulation, across the projection surface or through the viewing space in order to generate a spatially expanded image perceivable by the eye of the observer. If collimated light beams of a sufficiently small diameter are written into the viewing space, the focus of the generated real image will necessarily be maintained for projection distances of any length and projection surfaces of any shape, with an image pixel size corresponding to the diameter of the collimated light beam.

The device for implementing the beam shaping function for the combined beam of light operates according to one of the following technical solutions, which may be controlled, if necessary:

by means of a conventional adjustable optical system;

by means of a micro-optical system;

by means of a beam shaping grating;

by means of a beam shaping reflector;

beam shaping by means of refraction index variation within the beam shaping element;

beam shaping by geometry variation (thickness, curvature) of the beam shaping element.

The device for implementing the beam deflection function for the combined beam of light operates according to one of the following technical solutions, which may be controlled in synchronism with the intensity- or amplitude modulation and color modulation:

by means of a conventional adjustable optical system;

by means of a movable reflector with an optically active surface;

by means of a movable grating or a variable grating;

by means of an electro-optical, acousto-optical, thermo-optical, magneto-optical, opto-optical, photo-thermal and/or non-linear optical grating;

by means of an electro-optical, acousto-optical, thermo-optical, magneto-optical, opto-optical, photo-thermal and/or non-linear optical deflector in volume material (bulk);

by means of an electro-optical, acousto-optical, thermo-optical, magneto-optical, opto-optical, photo-thermal and/or non-linear optical deflector in micro-optical or integrated-optical construction;

by means of an integrated-optical multi-channel branch;

by means of a micro-mechanical deflector system, or by means of a micro-optical deflector system.

The beam shaping and beam deflecting unit can, furthermore, be constructed from a function-integrated element for beam shaping and beam deflection, in particular as a movable reflector with an optically active surface, or as an electro-optical grating, or by the generation of refractive index inhomogeneities in the volume material (bulk), or as a combination of micro-optical and micro-mechanical devices The embodiments in accordance with the invention described above may also be operated with only one wavelength of light, or one wavelength range of light, with it then being possible to generate a monochrome real or virtual image.

A further variant uses radiation from a wavelength or from a wavelength range from the spectral range of visible or invisible (infrared and ultraviolet) electromagnetic radiation, which is deflected onto a projection surface covered over its entire area with a luminophore. A visible monochrome image is created by fluorescence.

In a further variant, the projection surface is coated in a grid pattern with different luminophores, which when excited by light luminesce, e.g., in the basic colors of blue, green and red. The individual luminophore dots are arranged, e.g., as triplets, with each triplet forming an image pixel. On the one hand, the individual luminophore dots can be excited using one and the same wavelength, or one and the same wavelength range, of electromagnetic radiation (excitation light) individually and consecutively (time multiplex operation).

On the other hand, three different wavelengths or wavelength ranges may be used as excitation light, which three different wavelengths or wavelength ranges are capable of selectively exciting the various luminophore dots to emit light in the relevant basic color. The impression of a color image may be generated by the appropriate intensity- or amplitude modulation and deflection of the excitation light onto the different pixels of the projection surface.

Depending on the complexity desired of the module in accordance with the invention, some or all of the assemblies listed below are mounted on a carrier in addition to at least one waveguide:

at least one light source, at least one light modulator, the beam shaping and beam deflection unit, and the control electronics for light modulation, beam shaping and beam deflection. In the most extreme case, a module is manufactured containing all the functions of a color image generation system and need only be provided with electrical connections for power supply, control and setting to provide a usable color image generation system.

Variants are also possible which do not require movable conventional mechanical components, such as tilt mirrors or mirror scanners.

Using this invention, it is possible in principle to implement all conceivable applications for the presentation of real or virtual images in one module. Under certain circumstances it is appropriate that the light sources not be integrated with the module in order to increase the possible uses of the module which can be operated as a ready-to-use assembly.

An arrangement for the generation of very rapidly changing light intensities is created by the capabilities of electro-optical modulation, up to the GHz range according to the current state of the art. Bright color images and color television or video signals are generated on a screen (real images) or in space (virtual images) by the use of a rapid deflecting mechanism, which also allow medical applications, in particular in ophthalmology.

Further characteristics of the invention are revealed in the description of the drawings and in the sub-claims, with all individual characteristics and all combinations of the individual characteristics being essential to the invention.

The advantages of the arrangement may be found in the enhancement of the resolution of the television or video image, the capacity to increase the image frequency, an increase in brightness and contrast of the image and in a compact and integratable arrangement as a module. The voltages necessary to modulate the light components electro-optically are in the region of a few volts.

The image generated may be enlarged or reduced (zoom effect) with comparably little technical effort using the unit for beam shaping and beam deflection. Cut-out enlargements and the resolution of the image can be set by means of appropriate control unit operations.

The observer's eyesight defects can be compensated for by means of suitable adjustment of the imaging of the light beams in the beam shaping and beam deflection unit. Eyesight defects of the observer can be determined by means of adjustments to the imaging of the light beams.

In particular, the invention allows the use of known technologies in integrated optics and microelectronics to integrate all components of a color image generation system in one module. The module for the color image generation system comprises the mount, complete with all assemblies, and a suitable casing. The casing has a light exit aperture and connections for power supply, signal inputs and connections for setting the color image parameters.

The task of the invention will be solved by implementing the color image generation systems according to the invention.

The color generation systems according to this invention are suitable for all conceivable applications where control of the modulation facilities for intensity- or amplitude modulation and/or color modulation of light by means of any signal, in particular a television signal, a video signal, an audio signal, a computer-generated signal, or the signal of a measurement device, will produce an intensity- or amplitude modulated and color-modulated mixed color signal, which will then be projected into the viewing space and be available there for further use.

The color image generation system can be used as an image projection system for virtual or real images, in particular as an assembly for image projection, in particular laser television, as an assembly for image display, in particular peep show, as an assembly for a face-to-face telephone, as an assembly in video spectacles, as an assembly in an arrangement for displaying the so-called "virtual reality" (cyberspace), as an assembly in a device for generating holographic images, as an assembly in an arrangement for overlaying, by means of mirrors, operational data or traffic control information in reflecting separating layers, in particular in windscreens or instruments in vehicles, as well as in transparent separating walls of control stands in production facilities, as an assembly in weapons systems, in particular in target finding and target guiding systems, as an assembly for medical and therapeutic application areas, in particular in opthalmology for determining and correcting eyesight defects such as color ametropia, ametropia (visual acuity), stereo ametropia (capability for spatial vision), and squints, as a light animation system for cultural purposes, in particular as a light organ, as a light animation system for advertising purposes.

And the implementation of the color image generation system according to this invention is not limited to a particular format for the projection of real images.

The color image generation system can be used for projection onto a light-reflecting projection screen, or onto a ground glass screen.

And the projection screen or the ground glass screen can either act passively (normal reflection or normal backscattering), or actively change their reflection or scattering characteristics when subjected to radiation, or feature pixel groups (e.g. triplets) of luminophores, which react to the light wavelengths emitted by the color image generation system either wavelength-selectively or non-wavelength-specifically.

Furthermore, the color image generation system can be used as an assembly in a color graphics or color printing system, or an assembly in an exposure system for films.

BRIEF DESCRIPTION OF THE DRAWINGS

The invention will be described on the basis of the figures which show:

FIG. 20a–g: Beam shaping and beam deflection units with beam shaping and beam deflection functions integrated in one component;

FIG. 26: Color image generation system with combined fiber optic bundles, representing the state of the art;

FIGS. 1 to 18 and 21 to 24 show implementations of color image generation systems according to this invention, which are based on the principle of color generation using selective intensity- or amplitude modulation and additive color mixing by means of spatial combination of the individual light components.

FIGS. 25a to 25c show implementations of color image generation systems, which are based on the principle of color generation by subtractive color mixing.

FIG. 26 represents the state of the art in accordance with patent application DE31 52 020 A1.

In FIGS. 19 and 20, technical solutions for the beam shaping and beam deflection unit are described.

FIGS. 27 to 29 show example implementations of the color image generation system according to this invention.

DESCRIPTION OF THE PREFERRED EMBODIMENTS

Figure 1:
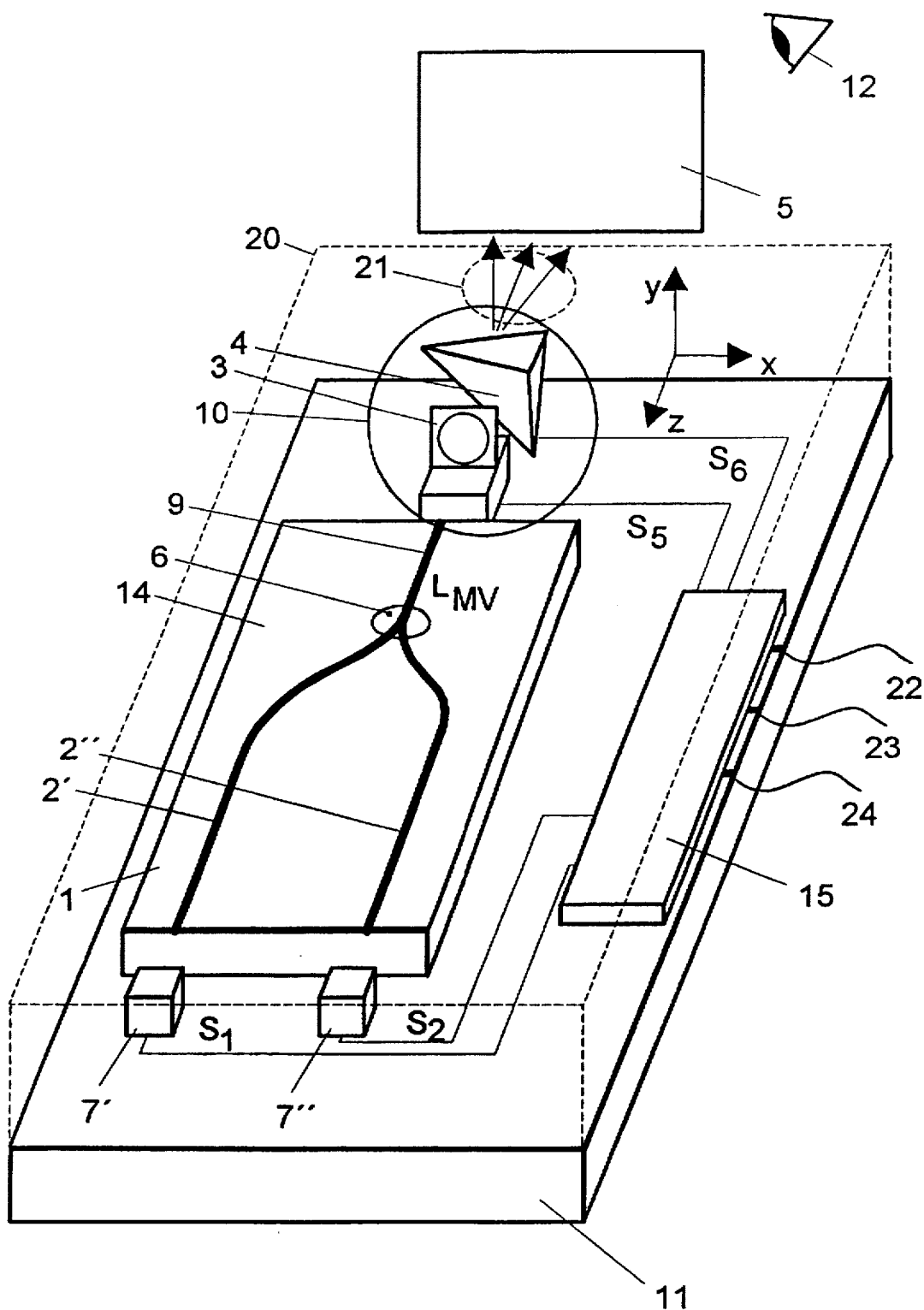
FIG. 1: Principle of a module for the generation of color images with a channel waveguide coupler.

FIG. 1 shows the design principle of the color image generation system as a module, in which the impression of a flicker-free color image is created from light in two colors by the physiological effect of color mixing in the human eye. All assemblies are mounted on a carrier 11. The module is used to generate a color mixing signal, in which the desired intensity ratio can be set, and to generate image spots or light beams, which are capable of being written in the desired direction into the viewing space.

The module is constructed using known technologies of integrated optics and microelectronics. All assemblies for the color image generation system:

two light sources 7', 7", a unit 14 for spatial combination of beams, a device for beam shaping and beam deflection 10, and an electronic control unit 15 for light modulation, beam shaping and beam deflection, are hybrid-integrated on the mount 11.

The surface of the mount 11 carrying the assemblies is protected by a suitable casing 20. The casing 20 has a light exit aperture 21 and connections to the power supply 22, electrical signal inputs 23 and electrical connections for setting the image reproduction parameters 24.

In the module, two light sources 7' and 7" which can be modulated are coupled with the unit for the spatial combination of beams 14. The unit for the spatial combination of beams 14 is coupled with the unit for beam shaping and beam deflection 10 for the generation of a real or virtual image. Each light source 7' and 7" and the unit for beam shaping and beam deflection 10 is connected with the control unit 15, which synchronizes the modulation of the light sources 7' and 7" with the beam projection through the unit for beam shaping and beam deflection 10. The unit for the spatial combination of beams 14 is here implemented as a passive unit.

The light sources 7' and 7" are laser diodes emitting light in the wavelengths for red light and green light.

The unit for the spatial combination of beams 14 consists of two integrated-optical channel waveguides 2', and 2", which are combined in the passive coupling point 6 into the common wideband channel waveguide 9. The channel waveguides 2' and 2" are not necessarily wideband channel waveguides, but are advantageously implemented as such. The three wideband channel waveguides form an integrated-optical wideband channel waveguide coupler. The channel waveguides need not be single-mode in the example, as modulation is not carried out in the channel waveguides.

The channel waveguide 2' corresponds to the light source 7', which emits light in wavelength $\lambda_1$. The channel waveguide 2" corresponds to light source 7", which emits light in wavelength $\lambda_2$.

A control unit 15 is connected through power lines to the light sources 7' and 7", and with the unit for beam shaping and beam deflection 10. Signals $S_1$ and $S_2$ are used for the intensity- or amplitude modulation of the light sources 7' and 7". Signal $S_5$ is used for adjusting the focusing of the intensity- or amplitude-modulated, and color-modulated, spatially combined light beam, and signal $S_6$ is used for beam deflection—for instance, into lines and columns. An intensity- or amplitude modulated, and color modulated, spatially combined light $L_{MV}$ originating from the light components of light sources 7' and 7" is available at the output of the common wideband channel waveguide 9.

The output of the common wideband channel waveguide 9 corresponds to the unit for beam shaping and beam deflection 10. The unit for beam shaping and beam deflection 10 comprises, in the example, of a beam shaping optical element 3, an optical lens in the example, which can be adjusted in the x-direction by control signal $S_5$ for the purposes of beam shaping, and of a device for deflecting the light beam 4, a three-sided pyramid in the example, which can be tilted by control signal $S_6$ around the y-axis (horizontal deflection) and around the x-axis (vertical deflection). The unit for beam shaping and beam deflection 10 writes a light beam into the surrounding space (viewing space) where the impression of a color image is created, which may be achieved as a real image on a screen 5 or for the generation of a virtual image in the human eye 12. The deflection of the combined light is achieved synchronously with the modulation of the light components with the wavelengths $\lambda_1$ and $\lambda_2$, to generate the impression of a color image in the eye.

However, it is not possible to generate (within the meaning that this term has today) a full color image with all color shadings.

Figure 2:
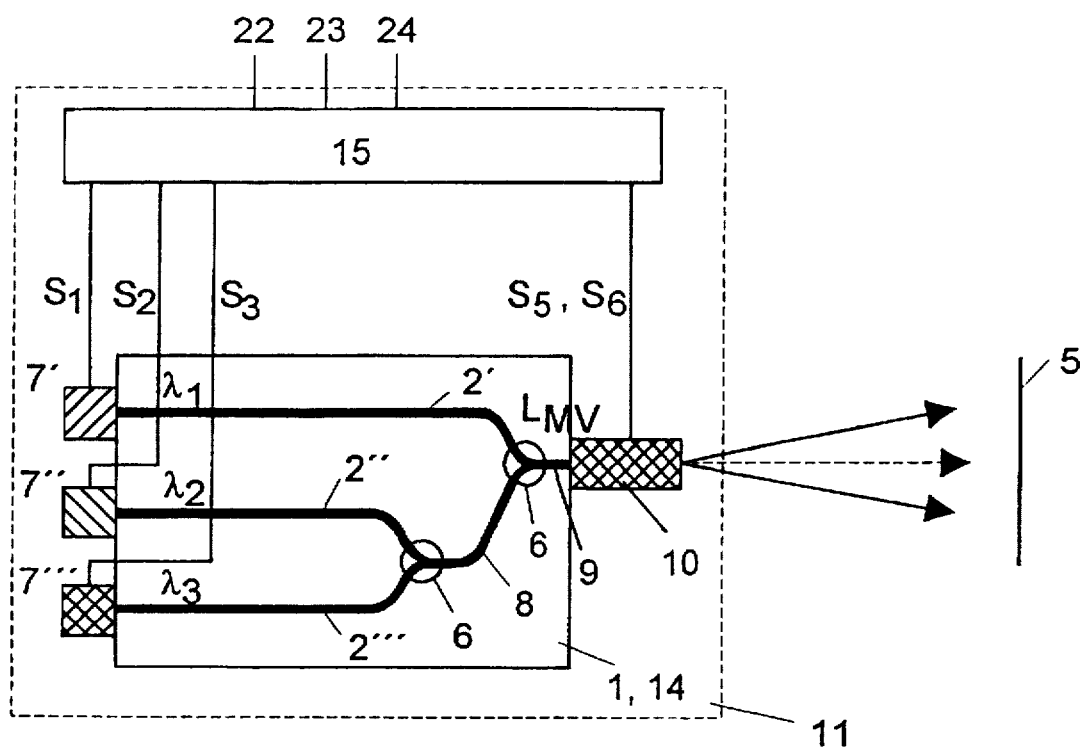
FIG. 2: Principle of the color image generation system using spatial combination of the light components in the basic colors red-green-blue.

FIG. 2 shows the design principle of the color image generation system by means of wideband channel waveguides for the generation of color images from the three basic colors of red, green and blue using the principle of additive color mixing. It consists of three light sources 7', 7" and 7''' which may be modulated and which are coupled with the unit for the spatial combination of beams 14. Wideband channel waveguide 2' corresponds to light source 7', which emits light of wavelength $\lambda_1$. Wideband channel waveguide 2" corresponds to light source 7", which emits light of wavelength $\lambda_2$. Wideband channel waveguide 2''' corresponds to light source 7''', which emits light of wavelength $\lambda_3$. The wideband channel waveguides 2" and 2''' are combined in a common wideband channel waveguide 8. The wideband channel waveguides 2' and 8 are combined in a common wideband channel waveguide 9. The coupling points are passive coupling points 6. Intensity- or amplitude modulated, and color modulated, spatially combined light $L_{MV}$ from the light components of light sources 7', 7", 7''' is available at the output of the common wideband channel waveguide 9. The output of the common wideband channel waveguide 9 corresponds to the unit for beam shaping and beam deflection 10.

Each light source 7', 7", 7''' and the unit for beam shaping and beam deflection 10 is connected with a control unit 15 which synchronizes the modulation of light source 7', 7", 7''' with the unit for beam shaping and beam deflection 10. Light sources 7', 7", 7''' are laser diodes which emit light in the wavelengths of red, green and blue light.

The unit for the spatial combination of beams 14 comprises the five wideband channel waveguides 2', 2", 2''', 8 and 9, three light inputs, two passive coupling points 6, and a light output. The passive coupling points 6 are formed by three wideband channel waveguides each, and thus are an integrated-optical wideband channel waveguide coupler. Since no modulation is carried out, the wideband channel waveguides do not need to be single-mode. Due to three basic colors being used, a full color image may be generated.

Figure 3:
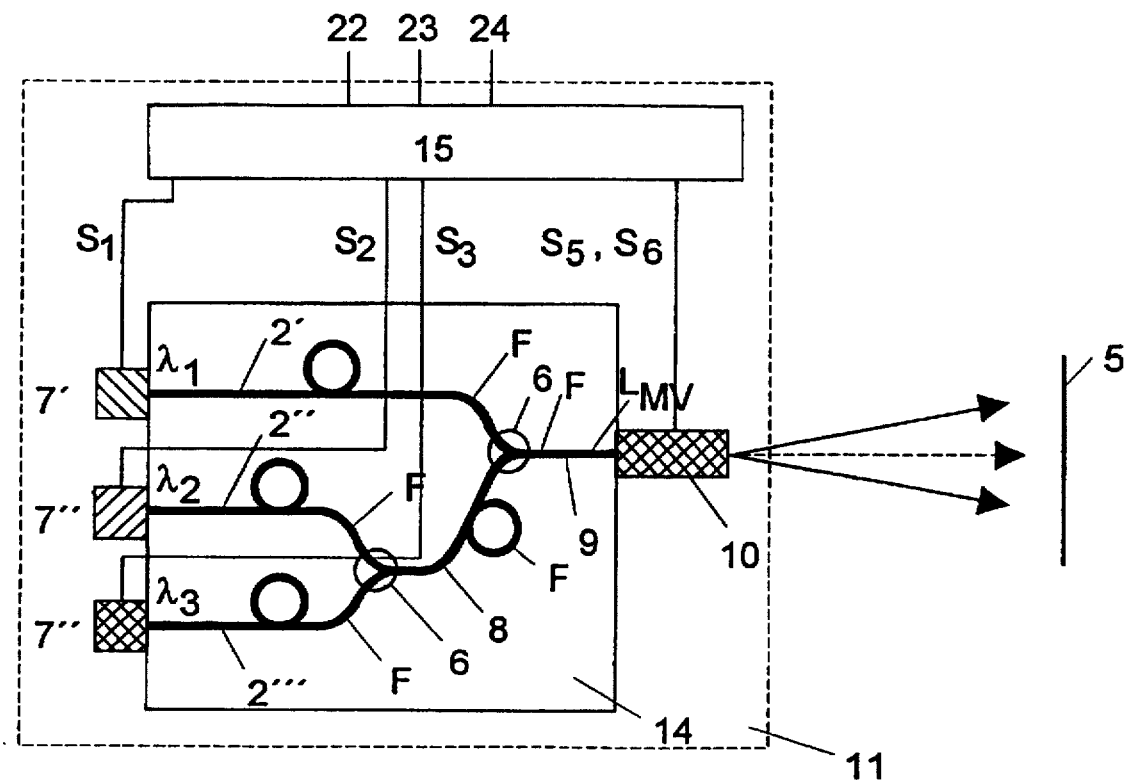
FIG. 3: Color image generation system with optical fiber couplers and modulation of the light sources.

FIG. 3 shows a color image generation system corresponding to that in FIG. 2 in which, however, the unit for the spatial combination of beams 14 is made up of optical fibers F as waveguides 2', 2", 2'''. The light is combined in the manner described in FIG. 2.

The optical fibers (waveguides 2", 2''', and 2', 8) can be joined to the coupling points 6 by surface fusing at the external diameters of both fibers in a range of a few millimeters. Light transmission is continued in the common fibers 9 and is used for onward transmission of the modulated, spatially combined light $L_{MV}$.

Waveguides and coupling points form a unit for the spatial combination of beams 14. The fibers are in fixed position on mount 11, and the fiber ends correspond to light sources 7 and the unit for beam shaping and beam deflection 10, located on the mount.

Figure 4:
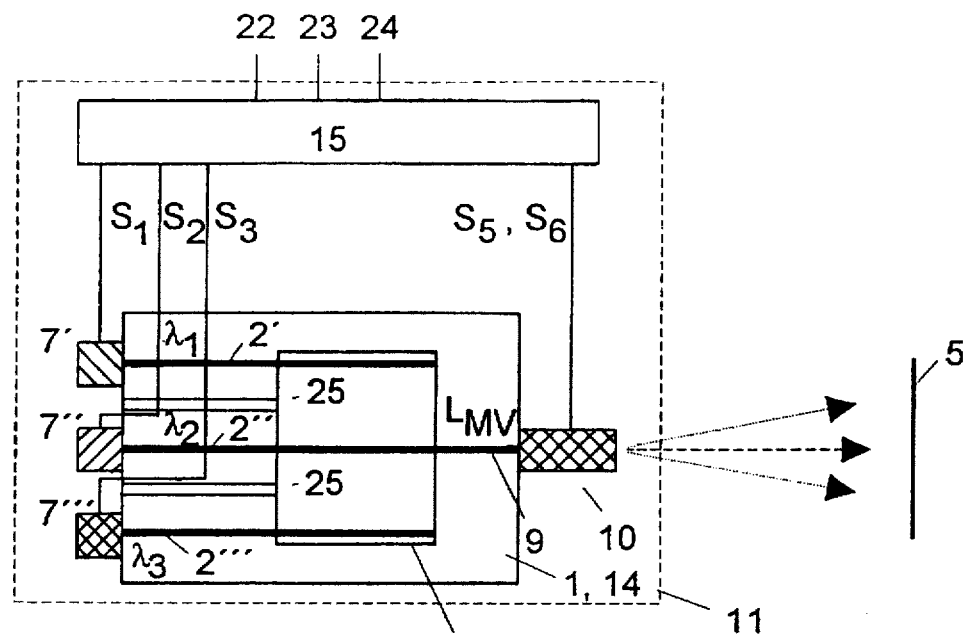
FIG. 4: Color image generation system with a quasi-waveguide coupler.

FIG. 4 shows a color image generation system in which the unit for the spatial combination of beams 14 consists of quasi-waveguides (ARROW) and quasi-waveguide couplers (ARROW couplers). The design principle of a structure of three adjacent ARROWs is shown. Light of wavelength $\lambda_1$ is guided in one ARROW (waveguide 2'). Light of wavelength $\lambda_2$ is guided in another ARROW (waveguide 2"). Light of wavelength $\lambda_3$ is guided with a further ARROW (waveguide 2'''). The Figure shows three adjacent ARROWs 2, which, from the point of beam injection to the start of coupling point 6, are separated from each other by absorbers 25. The light components are spatially combined in the area of coupling point 6 of the three quasi-waveguides, with the continuing ARROW (here identified as wideband waveguide 9) carrying the light components of all three wavelengths $\lambda_1$, $\lambda_2$ and $\lambda_3$.

The color image generation system illustrated in FIG. 2 corresponds in illustration and function to the system described here in FIG. 4 with the difference that the unit for the spatial combination of beams 14 is made up from quasi-waveguides (ARROW) in the form of waveguides 2', 2", 2'''. The overcoupling behaviour of the ARROW structure for identical wavelengths is known. The spatial combination of light beams can be theoretically illustrated for different wavelengths.

By means of appropriate dimensioning it is possible to create an ARROW structure which is capable of guiding and spatially combining a number of different wavelengths into one ARROW, and into one ARROW coupler, with adequate efficiency.

Figure 5:
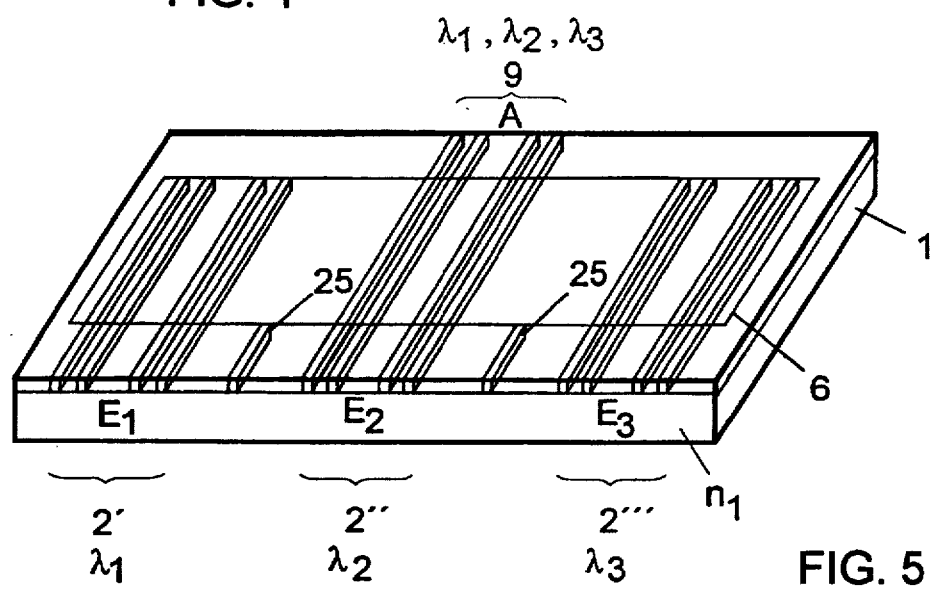
FIG. 5: Principle of the quasi-waveguide coupler.

FIG. 5a and 5b show three adjacent ARROWs which are separated from one another by absorbers 25 starting from the point at which the light is injected (inputs E) to the start of the coupling point 6. The light components of the three wavelengths $\lambda_1$, $\lambda_2$ and $\lambda_3$ are spatially combined in the coupling point 6. The spatially combined light components are transmitted on to output A in the common waveguide 2", which is continued as a common wideband waveguide 9.

Figure 6A:
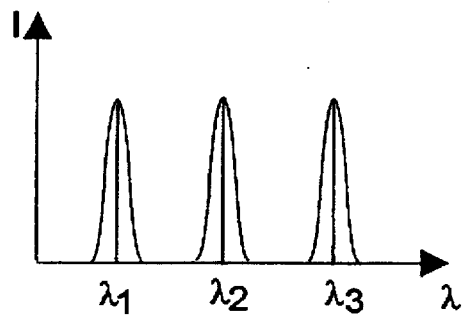
FIG. 6a and 6b: Illustration of the transmission characteristic of the quasi-waveguide.

FIG. 6 illustrates possible transmission characteristics. FIG. 6a shows the transmission characteristics of an ARROW, the geometry of which has been selected such that a resonance condition is fulfilled with, technically seen, adequate efficiency for three different wavelengths, for example the colors red, green and blue.

Figure 6B:
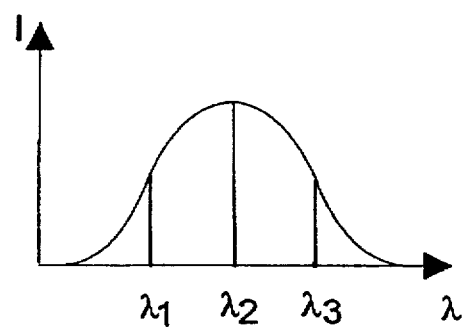

FIG. 6b shows a wideband transmission characteristic of an ARROW, which transmits the wavelengths of the colors red, green and blue with, technically seen, adequate efficiency.

Figure 7:
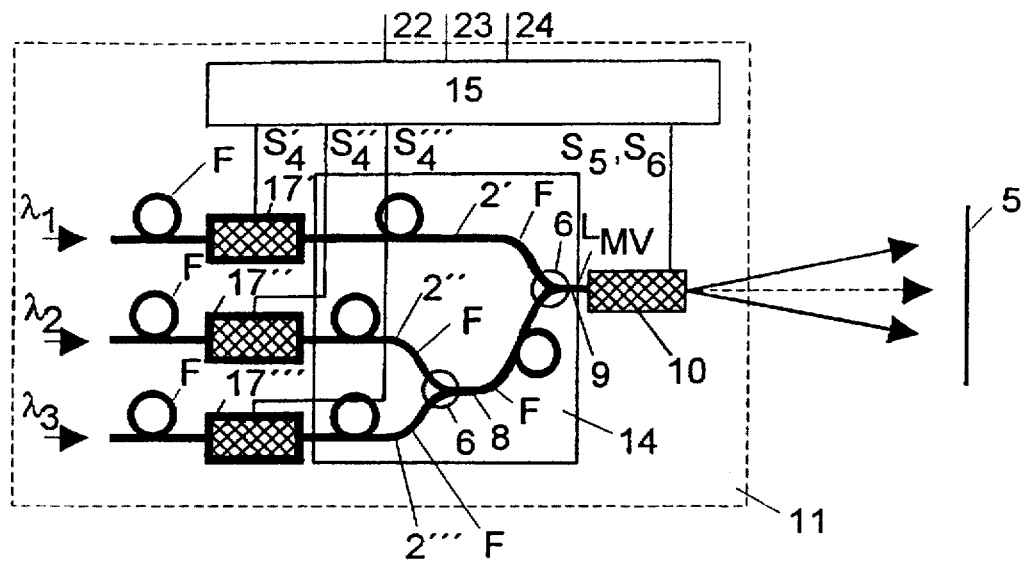
FIG. 7: Unit for the spatial combination of beams using optical fiber modulators.

FIG. 7 shows an arrangement for the generation of color images in which the modulation devices 17, 17' and 17" are connected to single-mode wideband optical fibers F. The single-mode wideband optical fibers are connected together such that a unit for the spatial combination of beams 14 on a common mount 11 is created (see FIG. 3). The modulators take the form of fiber modulators and are based on the principles of mechanical (piezo-electric), magneto-optical, electro-optical, thermo-optical, opto-optical or photo-thermal modulation or function as controllable fiber amplifiers.

Figure 8:
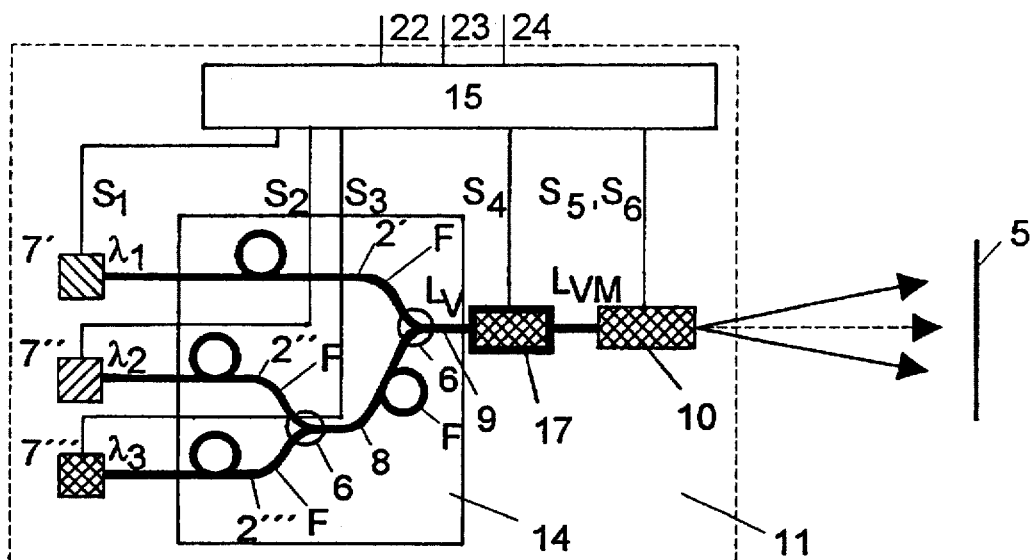
FIG. 8: Modulation by controlling the light sources as well as intensity- or amplitude modulation by means of an optical fiber modulator in time multiplexed operation.
Figure 8:
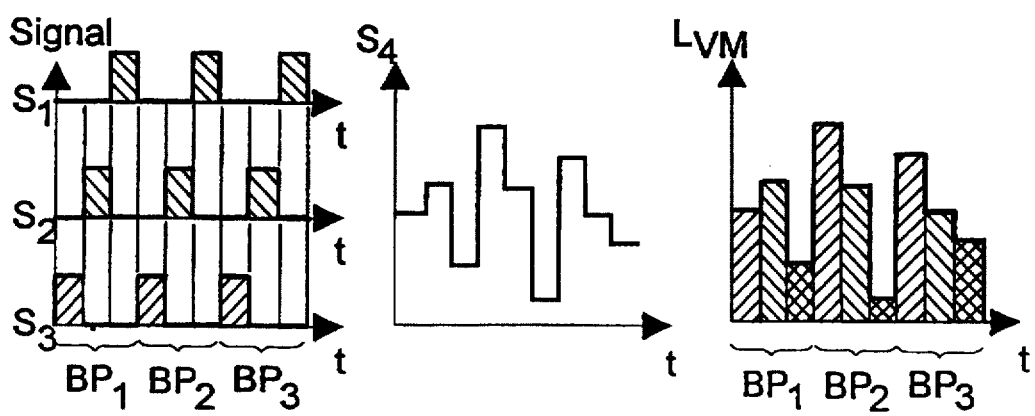

FIG. 8 shows an arrangement for the generation of images in which the red, green and blue light components are transmitted in time-multiplexed mode. Light sources 7', 7" and 7''' emit light pulses sequentially, which are controlled by the control unit (control signals $S_1$, $S_2$ and $S_3$). The light pulses are combined spatially ($L_V$) in time sequence in the unit for the spatial combination of beams 14, which consists of single-mode wideband optical fibers, and are then modulated in their intensity by means of control signal $S_4$ with the modulation device 17 mounted on the common single-mode wideband optical fiber 9. The spatially combined intensity- or amplitude modulated light components $L_{VM}$ of the colors red, green and blue, which are required for the generation of a color image spot $BP_i$ (i =1, 2, . . . ), are projected sequentially (time-multiplexed) by the unit for beam shaping and beam deflection 10. The color components of an image spot are projected in very rapid sequence, for example first in red, then in green and then in blue (see graphs in FIG. 8). The eye "adds up" a colored image spot $BP_i$ from the individual single-color image spot components. The rapid spatial deflection of tightly clustered colored image spots generates the impression of a color image. In this example, single-mode wideband optical fiber couplers are illustrated. The function is analogous with the single-mode integrated-optical wideband channel waveguide coupler and the single-mode quasi-waveguide coupler.

Figure 9:
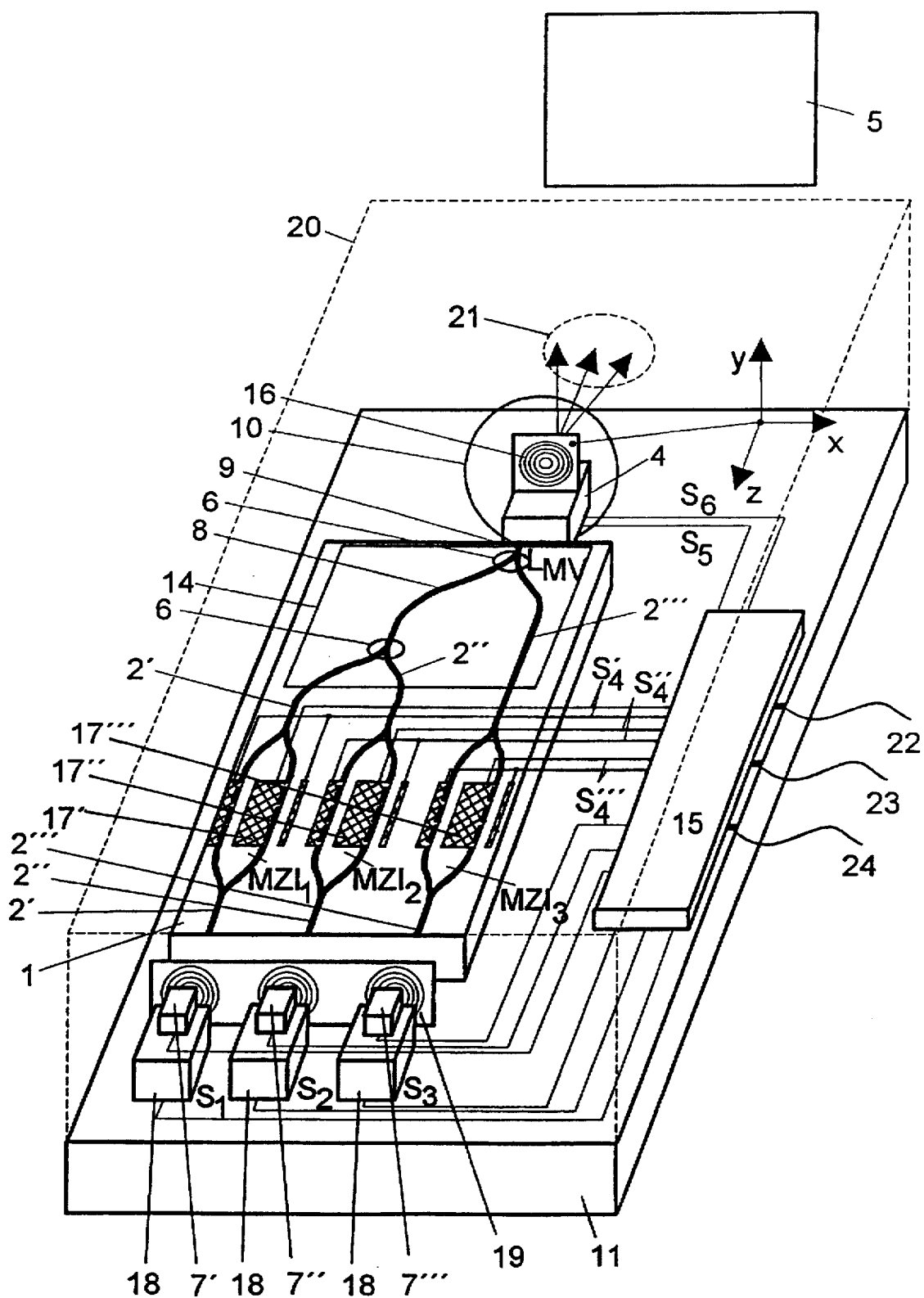
FIG. 9: Complete color image generation system as a module.

FIG. 9 shows a color image generation system as a module with a unit for the spatial combination of beams 14 consisting of single-mode integrated-optical wideband channel waveguides (SOWCW) 2, 8, 9, as well as Mach-Zehnder interferometer structures MZI as intensity- or amplitude modulators 17', 17", 17"' in the single-mode integrated-optical wideband channel waveguides 2', 2" and 2"' in a substrate 1 made of potassium titanyl phosphate ($KTiOPO_4$, KTP). The Figure shows a hybrid-integrated, integrated-optical color image projection system which contains all the components on one common mount 11.

The three laser diodes 7', 7" 7"', which emit light in the colors red, green and blue, the unit for the spatial combination of beams 14, and the unit for beam shaping and beam deflection 10, and the control unit 15 are mounted on the common mount 11. The laser diodes 7 are mounted on a temperature stabilization device 18, located between the mount 11 and the laser diodes 7. The generally divergent light from the laser diodes is injected into the single-mode integrated-optical wideband channel waveguides 2', 2", 2"' of the unit for the spatial combination of beams 14 by means of beam injection assembly 19, a micro-optical assembly in the example, comprising three fresnel lenses mounted at a distance from one another on the substrate material. The unit for the spatial combination of beams 14 is implemented in this case with passive coupling points 6. Amplitude modulation is carried out by electrooptically controllable Mach-Zehnder interferometer modulators $MZI_1$, $MZI_2$, $MZI_3$, which are arranged in the single-mode integrated-optical wideband channel waveguides 2', 2", 2"' as light-conducting and light-controlling structures.

The propagation constant or the phase of the guided light in the two branches of the Mach-Zehnder interferometer structure are modified with different signs by the application of control voltages (signals $S_4'$, $S_4"$, $S_4"'$) to the electrodes through the electro-optical effect in the electro-optically active material. Depending on the phase position, there is constructive or destructive interference at the point where the light of both arms is combined in the Mach-Zehnder interferometer modulator. The amplitude in the single-mode integratedoptical wideband channel waveguides 2', 2" and 2"' is thus controlled by the modulation voltage. The single-mode integrated-optical wideband channel waveguides 2', 2" or 2"', 8 are then combined at the passive coupling points 6. The intensity- or amplitude modulated, and color modulated, spatially combined light $L_{MV}$ is fed out by a micro-optical lens 16, which can be moved by means of a Piezo element perpendicularly to the direction of propagation in two dimensions. It fulfils the functions of the unit for beam shaping and beam deflection 10 jointly in a single component.

The divergent light from the output of the common channel waveguide 9 is focused onto the projection plane (screen 5), or a collimated light beam is written into the observation space, by the micro-optical lens 16.

The image field is scanned by a shift of the micro-optical lens 16 in the x and y directions. A piezo-electric component is provided beneath the micro-optical lens 16 as a device for beam deflection 4 for the mechanical adjustment of the lens position perpendicular to the direction of light propagation. All assemblies necessary for the generation of color images, i.e. the control unit 15 for the laser light sources and their temperature compensation (temperature stabilization device 18), the micro-optical assembly for injecting the beam 19, the substrate 1 with the three Mach-Zehnder interferometer modulators MZI and the unit for the spatial combination of beams 14 and also the unit for beam shaping and beam deflection 10 are mounted on the carrier 11. On mount 11, the casing 20 surrounding all assemblies—complete with light exit aperture 21—is fitted.

Figure 10:
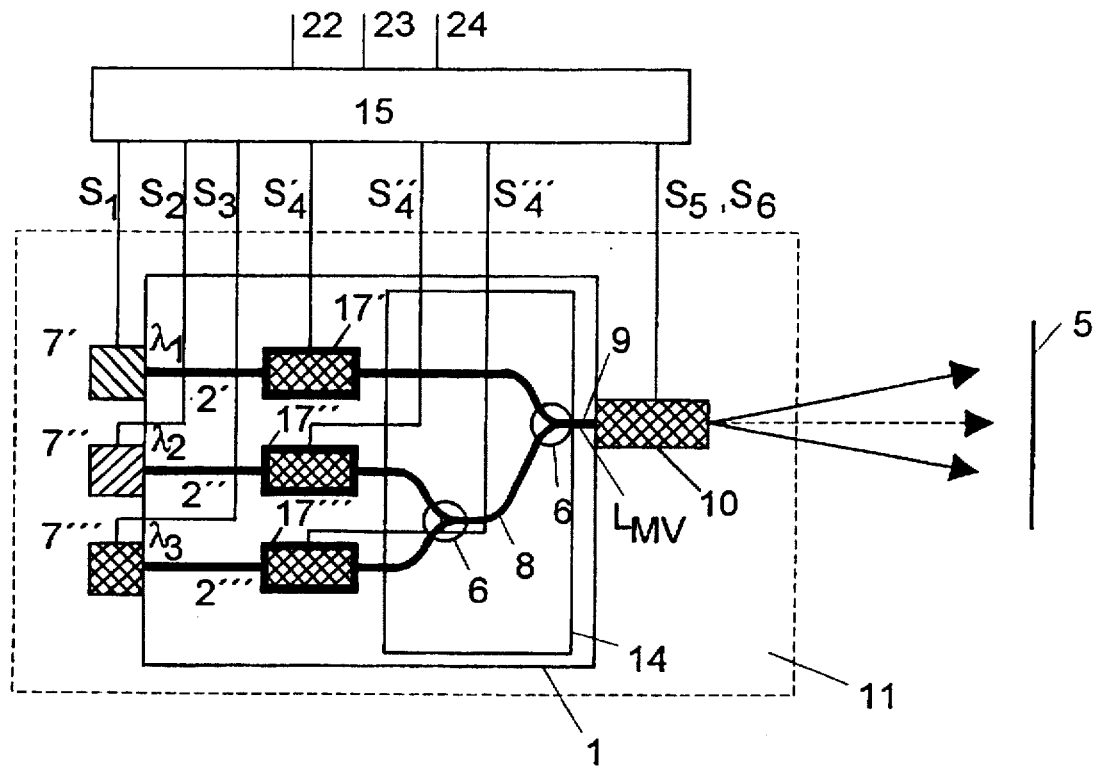
FIG. 10: Color image generation system for the generation of a real image.

FIG. 10 shows an integration of the components, namely the light sources 7', 7", 7"', the channel waveguides 2, 8, 9 in the unit for the spatial combination of beams 14, the intensity- or amplitude modulators 17', 17", 17"' on channel waveguides 2', 2", 2"', the control unit 15, and the unit for beam shaping and beam deflection 10 on a mount 11 for the generation of a real image. Signals $S_1$, $S_2$ and $S_3$ control the light sources 7', 7", 7"'.

Signals $S_4'$, $S_4"$ and $S_4"'$ each control an intensity- or amplitude modulator 17', 17", 17"' in the channel waveguides 2', 2" and 2"'. The unit for beam shaping and beam deflection 10 generates a real image in a projection plane which contains a screen 5 or a projection surface. The divergent bundle of beams at the output of the common wideband channel waveguide 9 is projected as a point in the projection plane by means of a bundle-shaping optical system. The point is deflected by the unit for beam shaping and beam deflection 10 such that the points can be projected in sequence in the projection plane.

Figure 11:
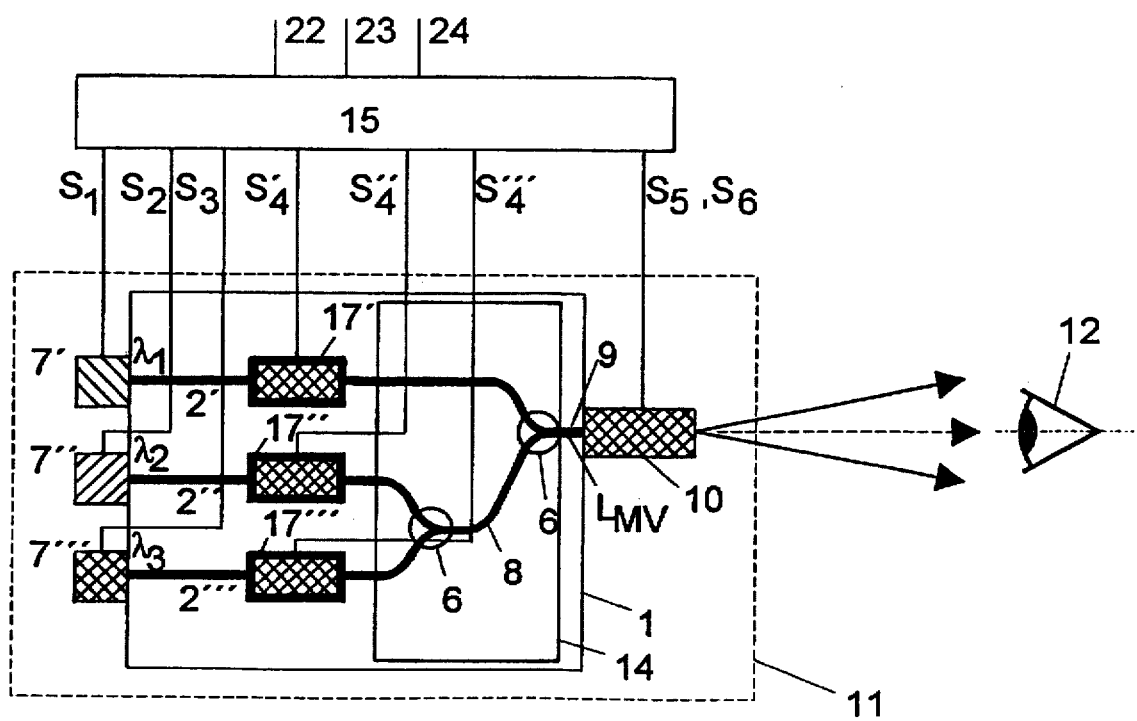
FIG. 11: Color image generation system for the generation of a virtual image.

FIG. 11 shows an integration of the components, namely the light sources 7', 7", 7"', the channel waveguides 2, 8, 9 in the unit for the spatial combination of beams 14, the intensity- or amplitude modulators 17', 17", 17"' in channel waveguides 2', 2", 2"', the control unit 15, and the unit for beam shaping and beam deflection 10 on a mount 11 for the generation of a virtual image which can be directly viewed by the human eye 12.

The precondition is that the human eye 12 is located in the optical axis of the system formed by the common wideband channel waveguide 9 and the unit for beam shaping and beam deflection 10. This is achieved by the use of a suitable bracket before the eye (vision aid), by throwing an image on a glass (windscreen in a vehicle) or by observation of the image through a hole (peep show). The eyesight defect of poor vision can be measured and compensated for by an appropriate adjustment of the projection of the image spots in the unit for beam shaping and beam deflection 10.

The color image generation system is controlled in a manner analogous to that illustrated in FIG. 10.

FIGS. 12 to 17 show further integrated-optical implementation variants of the unit for the spatial combination of beams 14, in which the coupling point 6 for two channel waveguides can be actively influenced if required, i.e. controlled. Single-mode integrated-optical wideband channel waveguides (SOWCW) are illustrated in each case. The controllable coupling point 13 is designed for the controllable spatial combination of beams and/or for controllable beam guiding. The controllable coupling point 13 operates on the principle of two-mode interference as an X-coupler, directional coupler, three-guide coupler or BOA.

FIGS. 13 to 16 show intersections of single-mode integrated-optical wideband channel waveguides in which the intersection points are passive coupling points 6, or controllable coupling points 13, or fully passive intersections of channel waveguides.

Figure 12:
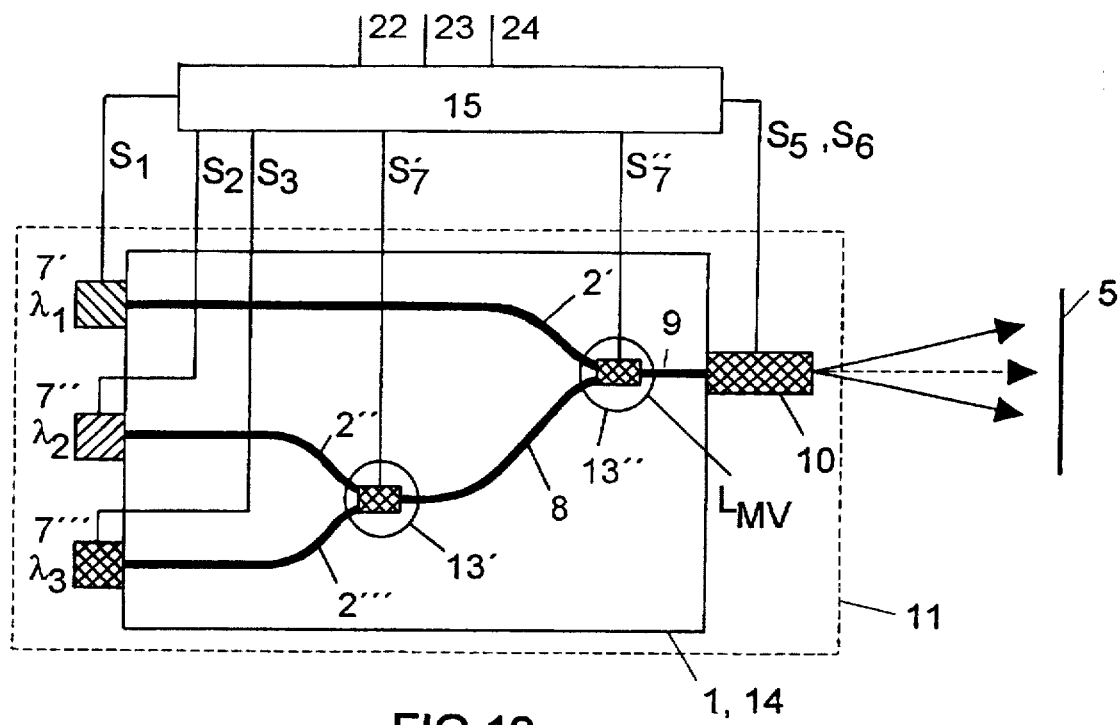
FIG. 12: Unit for the spatial combination of beams with controllable coupling points.

FIG. 12 shows a color image generation system in which the beam combination unit 14 is built up from single-mode integrated-optical wideband channel waveguides with controllable coupling points 13, which can be actively influenced by a control signal. Light in three wavelengths $\lambda_1$, $\lambda_2$ and $\lambda_3$ is injected into one each of the single-mode wideband channel waveguides 2', 2", 2'". The light components in the single-mode wideband channel waveguides 2" and 2'" are spatially combined in the active coupling point 13' with an intensity that can be controlled by means of the applied control signal $S_7'$ and then passed on in the single-mode wideband channel waveguide 8. The same procedure is carried out in the active coupling point 13" with the light components in the single-mode wideband channel waveguide 8 and the light component in the single-mode wideband channel waveguide 2' by means of control signal $S_7''$. Depending on technical capability to achieve implementation, intensity- or amplitude modulation can be implemented with the light sources 7 and/or with the controllable coupling points 13. The spatially combined, intensity- or amplitude-modulated, and color-modulated light $L_{VM}$ may be fed out from the single-mode wideband channel waveguide 9 into the unit for beam shaping and beam deflection 10.

Figure 13:
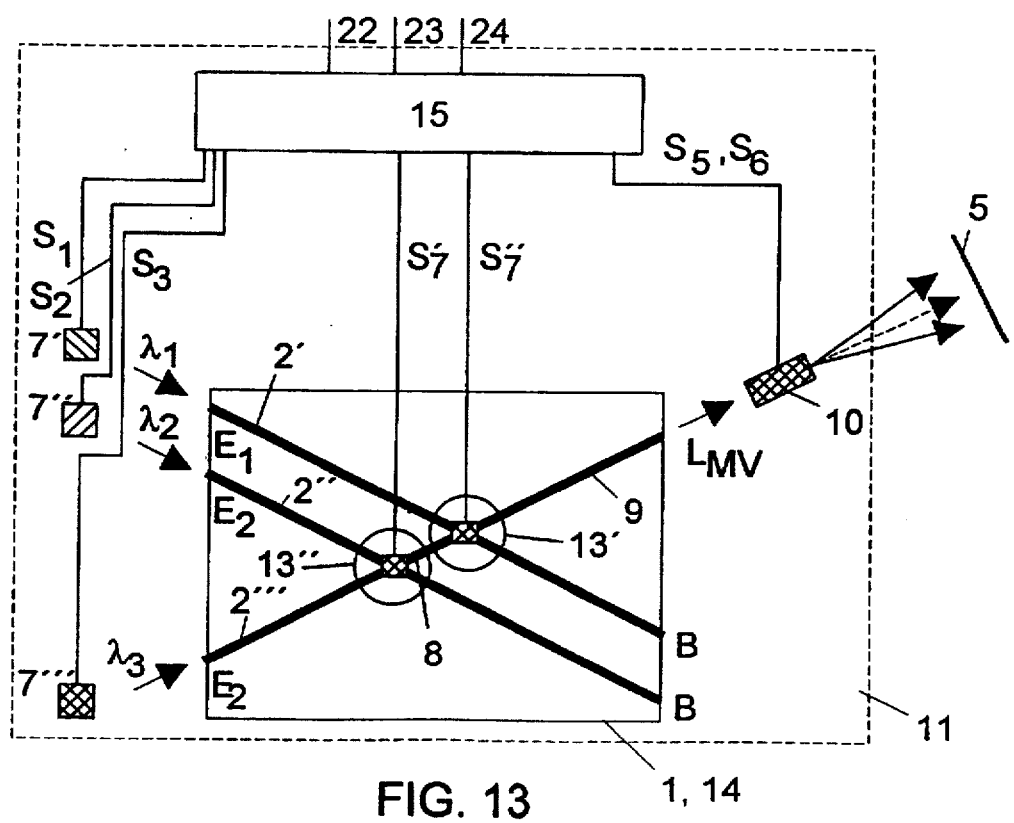
FIG. 13: Color image generation system with X-couplers as controllable coupling points in 2×1 matrix arrangement.

FIG. 13 shows an intersection of two single-mode wideband channel waveguides 2' and 2" with a further single-mode wideband channel waveguide 9 as a 2×1 matrix. The two intersections form controllable coupling points 13. Light may be injected into the inputs $E_1$, $E_2$ and/or $E_3$. Controllable coupling points 13' and 13" are controlled such that spatially combined, intensity- or amplitude modulated, and color modulated, light $L_{VM}$ may be fed out from the single-mode wideband channel waveguide 9. It is advantageous to operate this device in time-multiplexed mode (as described in FIG. 8), to avoid possible problems caused by the mutual interaction of the modulation of the different light components.

Figure 14:
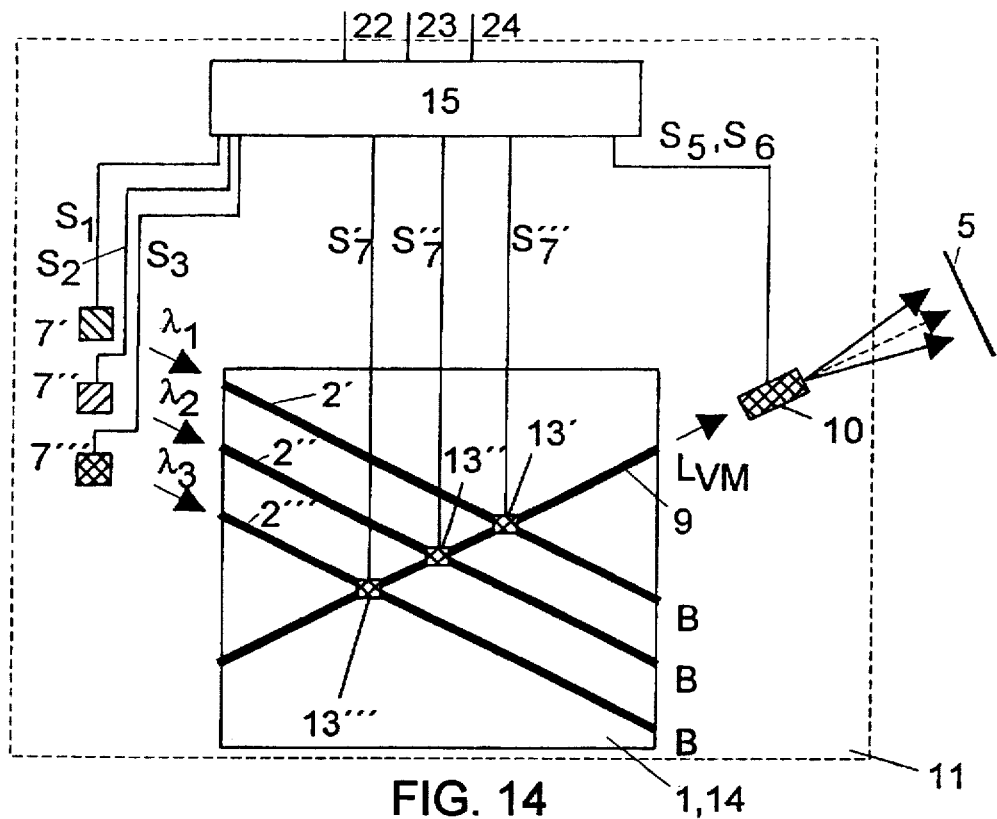
FIG. 14: Color image generation system using a structure with intersecting channel waveguides in 3×1 matrix arrangement with controllable coupling points.

FIG. 14 shows the intersection of three single-mode wideband channel waveguides 2', 2", 2'" with a further single-mode wideband channel waveguide 9 (3×1 matrix). The controllable coupling points 13 control the spatial beam combination and beam guiding. Light of three wavelengths $\lambda_1$, $\lambda_2$ and $\lambda_3$ is injected into one each of the single-mode wideband channel waveguides 2', 2", 2'". The controllable coupling points 13 act as light gates, which allow the light in the single-mode wideband channel waveguide 9 to pass in the direction of the light exit completely uninfluenced, but deflect the light components of the wavelengths $\lambda_1$, $\lambda_2$ and $\lambda_3$ in the single-mode wideband channel waveguides 2', 2", 2'" as a function of the applied control signals $S_7'$, $S_7''$ and $S_7'''$ with differing electro-optical efficiency in the direction of the common single-mode wideband channel waveguide 9 and spatially combine them. The non-deflected proportion in the single-mode wideband channel waveguides 2', 2", 2'" is passed forward to the blind outputs B. The controllable coupling points 13', 13" and 13'" are dimensioned such that they act simultaneously as wavelength-specific modulators, as spatial combiners of the light components and as wavelength-specific light guiding devices for the wavelength $\lambda_1$, $\lambda_2$ or $\lambda_3$ selected in each case. Coupling point 13' modulates light of wavelength $\lambda_1$. The light of wavelengths $\lambda_2$ and $\lambda_3$ can pass through this coupling point without hindrance. Coupling point 13" modulates light of wavelength $\lambda_2$. The light of wavelengths $\lambda_1$ and $\lambda_3$ can pass through this coupling point without hindrance. Coupling point 13'" modulates light of wavelength $\lambda_3$. The light of wavelengths $\lambda_1$ and $\lambda_2$ can pass through this coupling point without hindrance.

Spatially combined intensity- or amplitude modulated, and color modulated light $L_{VM}$ is available at the output of the common single-mode wideband waveguide 9 for projection purposes. Unused light components are sent to the blind outputs B.

The possible mutual interaction of light components $\lambda_1$, $\lambda_2$ and $\lambda_3$ at the controllable coupling points 13', 13" and 13'" can be corrected by means of suitable electronic correction of the control signals $S_1$, $S_2$, $S_3$, $S_7'$, $S_7''$ and $S_7'''$. This arrangement can, however, be implemented particularly easily if the three light components are emitted by the light sources sequentially (in timemultiplexed mode) and are modulated individually.

In this case the function of the respective sole controllable coupling point 13 is restricted to the intensity modulation and guiding of the light component currently present in the time interval. The other coupling points are passive and are switched to passage in the direction of the wideband waveguide 9.

Figure 15:
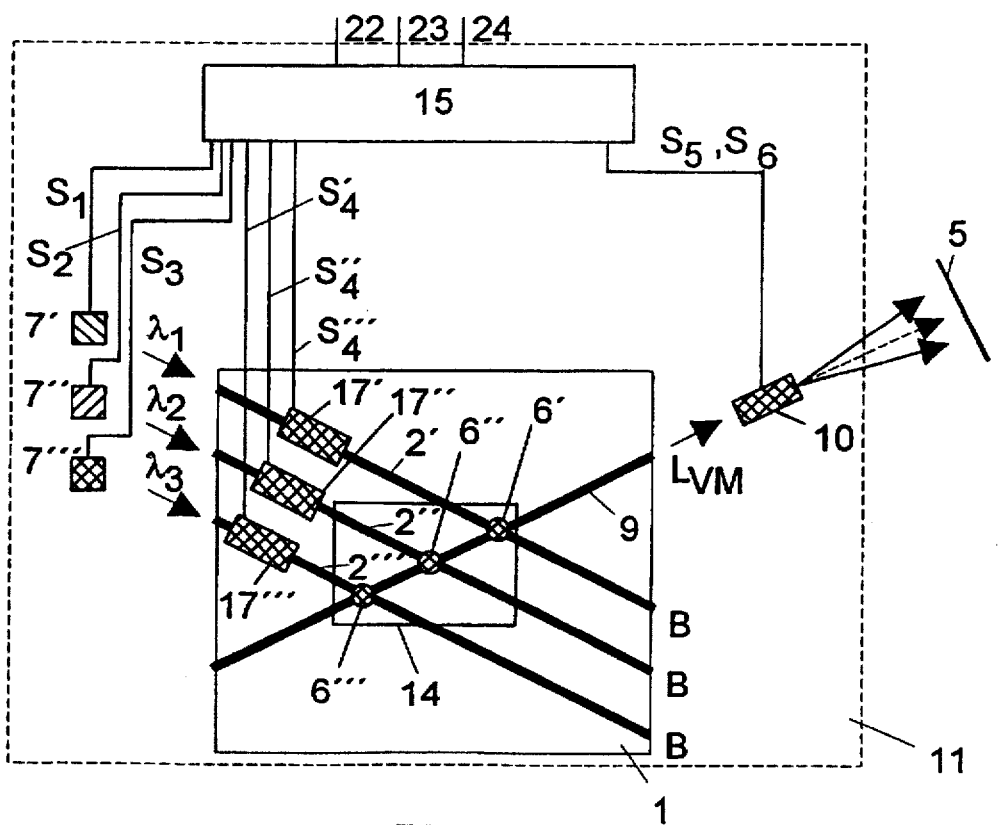
FIG. 15: Color image generation system using a structure with intersecting channel waveguides in 3×1 matrix arrangement with intensity- or amplitude modulators in channel waveguides, and passive coupling points.

FIG. 15 shows a further integrated-optical embodiment variant of the unit for the spatial combination of beams 14 with passive coupling points 6 constructed in the form of waveguide intersections. The single-mode wideband channel waveguides 2', 2", 2'" intersect the further single-mode wideband channel waveguide 9. The coupling point 6 is a passive unit for the spatial combination of beams and beam guidance. For the purposes of intensity- or amplitude modulating the light components, modulation devices 17', 17" and 17'" are mounted on one each of the single-mode wideband channel waveguides 2', 2", 2'" and allow the light of the three wavelengths $\lambda_1$, $\lambda_2$ and $\lambda_3$ to pass at different levels as a function of the control signals $S_4'$, $S_4''$ and $S_4'''$ applied under electro-optical control. The passive coupling points 6 act as light deflectors, in which the individual light components are spatially combined and guided to the output of the single-mode wideband channel waveguide 9 and fed to the unit for beam shaping and beam deflection 10.

Figure 16:
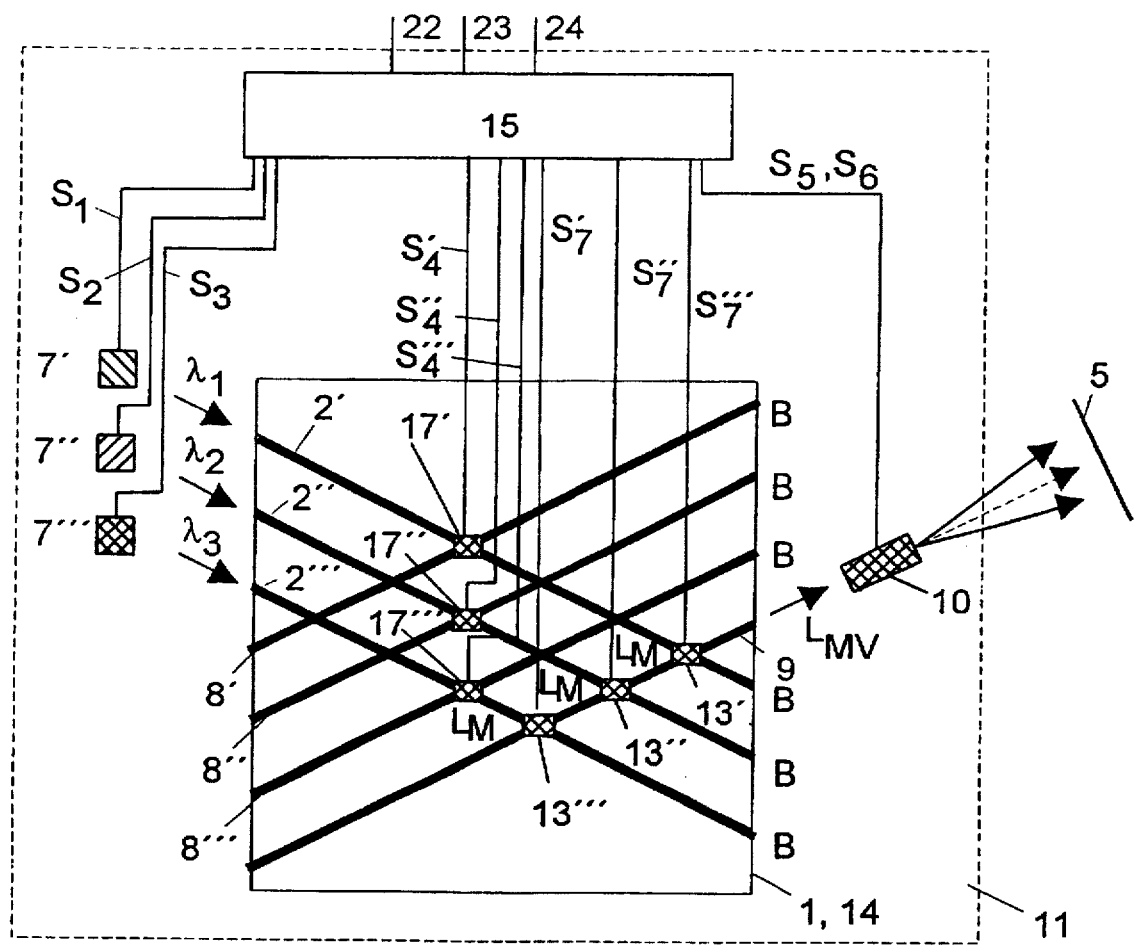
FIG. 16: Color image generation system using a structure with intersecting channel waveguides in 3×4 matrix arrangement.
Figure 16:
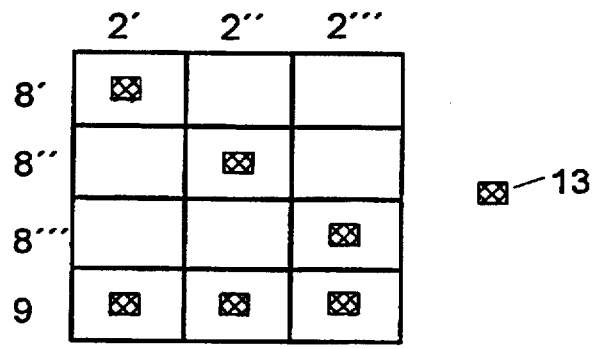

FIG. 16 shows a further integrated-optical embodiment variant of the unit for the spatial combination of beams 14 constructed from controllable coupling points 13 for spatial beam combination and/or beam guidance. Light of three wavelengths $\lambda_1$, $\lambda_2$ and $\lambda_3$ is each injected into one of the single-mode wideband channel waveguides 2', 2", 2'". The single-mode wideband channel waveguides 2', 2", 2'" intersect four further single-mode wideband channel waveguides 8', 8", 8'" and 9.

To clarify the function, the waveguide intersection points are illustrated in the form of a matrix. At the intersection points specified by the column and row pairs 2'-8', 2"-8" and 2'"-8'", the intersection points are provided as modulation devices 17', 17" and 17'". These units are used for intensity- or amplitude modulation of the three light components.

The controllable coupling points 13', 13" and 13'" are arranged at the intersections of the column and row pairs 2'-9, 2"-9 and 2'"-9. These units are used for the spatial combination of the light components. They are controlled to combine the intensity- or amplitude modulated light components $L_M$, and thus to emit intensity- or amplitude modulated, and color modulated, spatially combined light $L_{MV}$ at the output of the single-mode wideband channel waveguide 9 into the unit for beam shaping and beam deflection 10. Light components not required are passed to the blind light outputs B. The intersections of the column and row pairs 2'-9, 2"-9 and 2'"-9 may, however, also be passive coupling points 6', 6" and 6'" (in principle, these are controllable coupling points 13, without addressing), to combine the light components in space. Modulation is then implemented at the light sources 7 or in the single-mode wideband channel waveguides 2.

Figure 17:
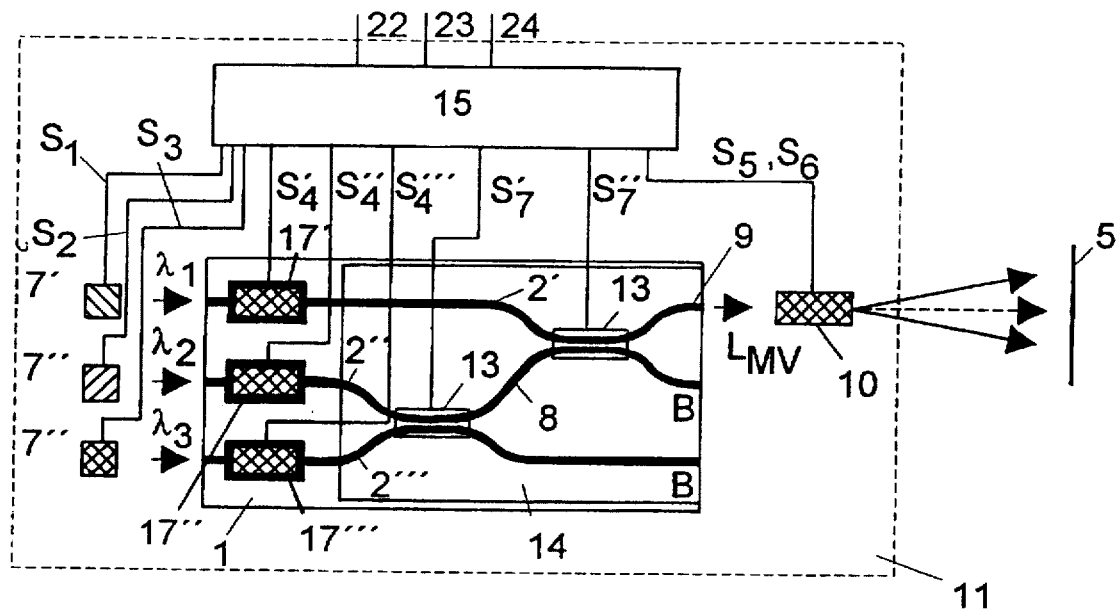
FIG. 17: Color image generation system with intensity- or amplitude modulators in channel waveguides, and directional couplers as controllable coupling points.

FIG. 17 shows a color image generation system with single-mode wideband channel waveguides 2, capable of modulation, and directional couplers as controllable coupling points 13. For the purposes of intensity- or amplitude modulation of the light components, the modulation devices 17', 17" and 17'" are each arranged on one of three single-mode wideband channel waveguides 2', 2" and 2'", which modulate the light of the three wavelengths $\lambda_1$, $\lambda_2$ and $\lambda_3$. The single-mode wideband channel waveguides 2' and 8 and the single-mode wideband channel waveguides 2" and 2'" are placed spatially alongside each other and constitute an integrated-optical directional coupler (controllable coupling point 13).

In dependence of the practical implementation capabilities for the directional couplers, it is not necessary to provide a control unit to the controllable coupling point 13, if it is possible to inject the light components with adequate efficiency (technically seen) into the common single-mode wideband channel waveguides 8 and 9.

If efficient coupling without control is not available, the directional couplers are controlled in order to switch or guide the light components into the common single-mode wideband channel waveguides 8 and 9. In this case, time-multiplexed operation of the light sources is the only possibility.

Figure 18:
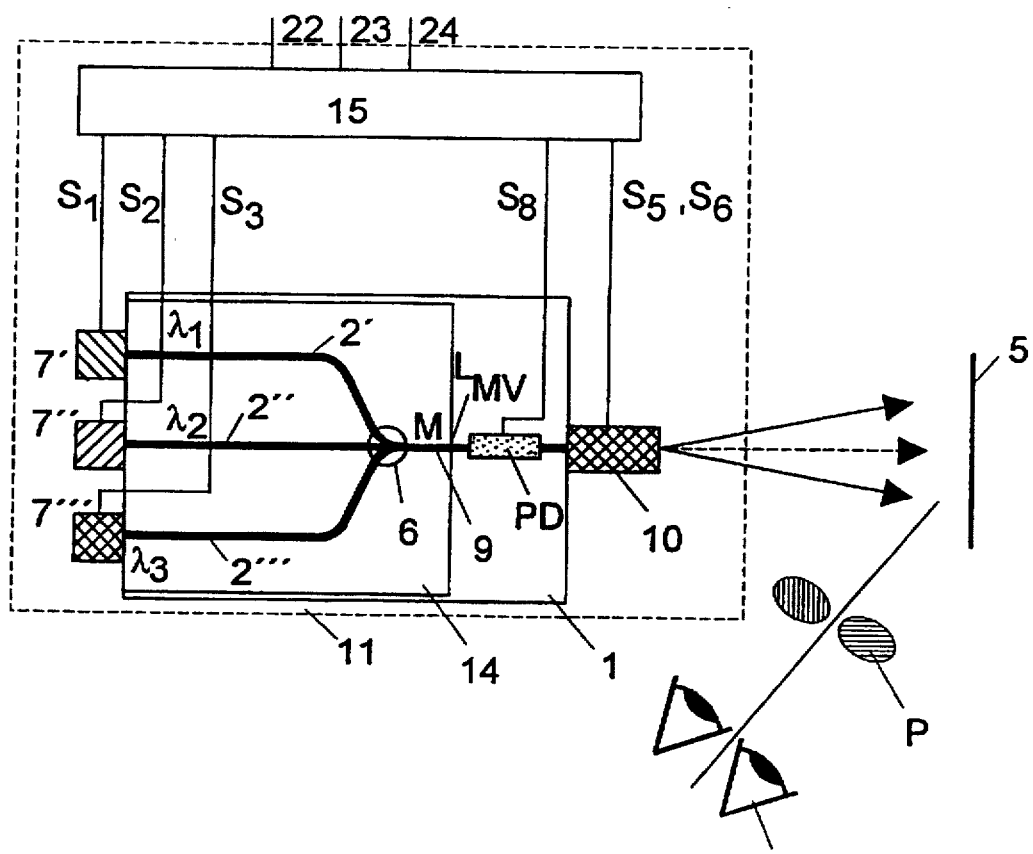
FIG. 18: Stereo color image generation system.
Figure 19A:
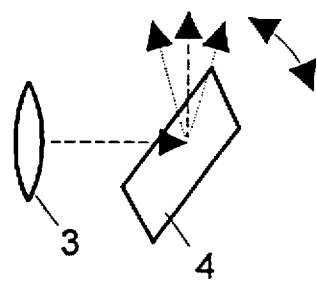
FIG. 19a–h: Beam shaping and beam deflection units with beam shaping and beam deflection functions implemented in different components.
Figure 19B:
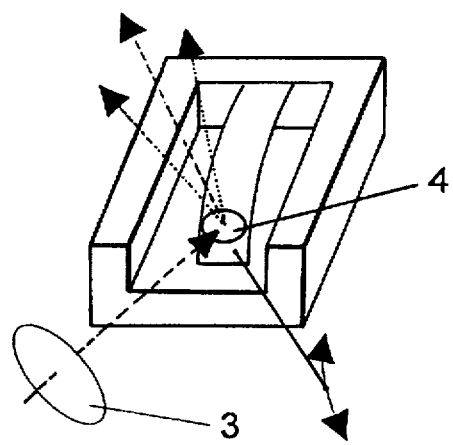
Figure 19C:
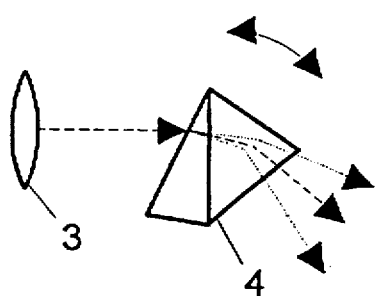
Figure 19D:
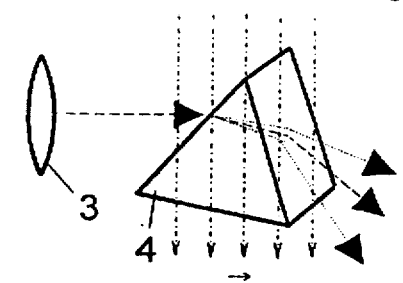
Figure 19E:
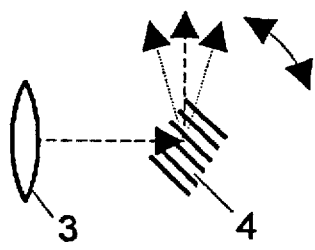
Figure 19F:
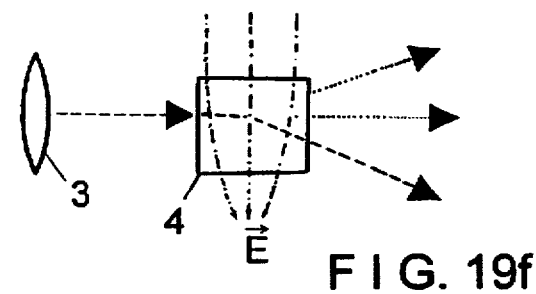
Figure 19G:
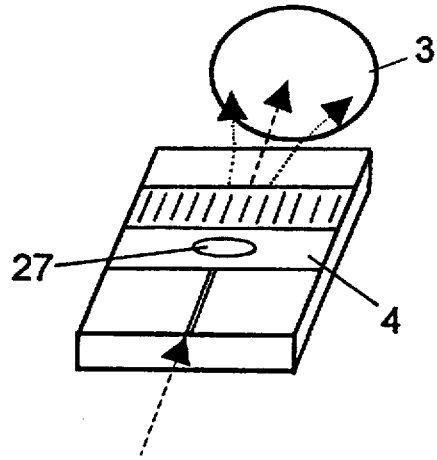
Figure 19H:
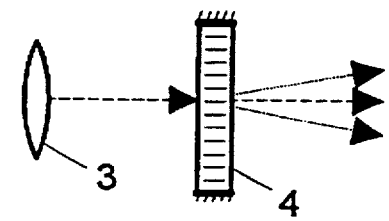

FIG. 18 shows a color image generation system for the generation of a stereo color image. The device can be set up in accordance with one of the preceding examples. In this example, the design corresponds in principle with the arrangement illustrated in FIG. 2, the difference being that the three waveguides 2', 2", and 2'" are combined into a passive coupling point 6.

A polarization converter PD is additionally mounted at the light output of the unit for the spatial combination of beams 14. The polarization converter PD is switched with a control signal $S_8$ from the control unit 15. The observer's eyes 12 observe the image projected on the screen 5 through polarizers P mounted in front of the eyes, e.g. through a special pair of spectacles.

The polarization converter PD delivers an image for the left eye in a first position and an image for the right eye in another position in rapid succession. The wavelength selectivity of polarization modulation demands that the system be operated in time-multiplexed mode.

The high possible frequencies of the intensity- or amplitude modulation, and color modulation, of the light components and deflection control of the spatially combined light guarantees that this method of stereo image generation can be achieved to a high quality.

One polarization converter PD can also be mounted in each of the channel waveguides 2', 2", 2'" (instead of in the common wideband channel waveguide 9, as illustrated in FIG. 18) (this set-up is not illustrated).

The system can alternatively also be used for the generation of virtual stereo color images (not illustrated).

FIG. 19a–g show some examples of the unit for beam shaping and beam deflection, the functions of which are split over a device for beam shaping 3 and a device for beam deflection 4:

a) beam shaping by means of lens 3 or a lens system and beam deflection 4 by means of a movable reflector (scanner), b) beam shaping by means of lens 3 and beam deflection 4 by means of a reflector which can be moved micro-mechanically, c) beam shaping by means of lens 3 and beam deflection 4 by means of a movable prism, d) beam shaping by means of lens 3 and beam deflection 4 by means of a prism with a variable refractive index, e.g. by means of the electro-optical effect induced by an external electrical field E, e) beam shaping by means of lens 3 and beam deflection 4 by means of a movable grating. It should be noted here that different wavelengths show a different angle of diffraction, and that therefore the grating angle must be corrected when the wavelength is changed, i.e. the grating moves with a high frequency. In this case only time-multiplexed operation is possible.

f) beam shaping by means of lens 3 and beam deflection 4 by means of a medium with a refractive index gradient oriented perpendicular to the direction of propagation of the light and which is generated, for example, by means of the electro-optical effect induced by an inhomogeneous external electrical field E.

g) beam shaping by means of lens 3 and beam deflection 4 by means of a grating generated acousto-optically in a planar waveguide. The common wideband waveguide ends on the chip and passes into a planar waveguide. If required, an integrated-optical lens 27 can be used to collimate the light fed out from the wideband waveguide. A standing or travelling acoustic surface wave is generated perpendicular to the direction of propagation of the light; this wave diffracts the light in the planar waveguide. The acoustic wavelength must be varied in order to generate the same angle of deflection for each light wavelength, i.e. the interdigital transformer (not shown here) generating the acoustic wave may only have one or a few pairs of electrodes, or it must feature a so-called chirp function of the electrode structure, in order to increase the bandwidth. In this case only time-multiplexed operation is possible.

h) beam shaping by means of lens 3 and beam deflection 4 by means of a grating generated acousto-optically in the volume (bulk) material. A standing or travelling acoustic surface wave is generated perpendicular to the direction of propagation of the light; this wave diffracts the light. The acoustic wavelength must be corrected accordingly in order to generate the same angle of deflection for each wavelength. In this case only time-multiplexed operation is possible.

FIG. 20a–shows some examples of the unit for beam shaping and beam deflection the beam shaping and beam deflection functions of which are integrated into one assembly:

a) by means of a movable and focusing reflector (scanner), b) by means of a micro-mechanically movable and focusing reflector, c) by means of a movable and focusing grating: It should be noted here that different wavelengths show a different angle of diffraction, and that therefore the grating angle must be corrected when the wavelength is changed, i.e. it is advantageous if the grating moves line-by-line or image-by-image in sequence, each time with one of the three wavelengths $\lambda_1$, $\lambda_2$ and $\lambda_3$. In this case only time-multiplexed operation is possible.

d) by means of a micro-lens movable perpendicularly to the direction of propagation of the light, e.g. piezo-electrically, e) by means of a lens movable perpendicularly to the direction of propagation of the light, e.g. piezo-electrically, f) by means of a decoupling grating which can be modulated and focused; in this case only time-multiplexed operation is possible, g) by means of an optical fiber which can be tilted mechanically, e.g. piezo-electrically, and is connected to feed-out optics (a lens).

Figure 21:
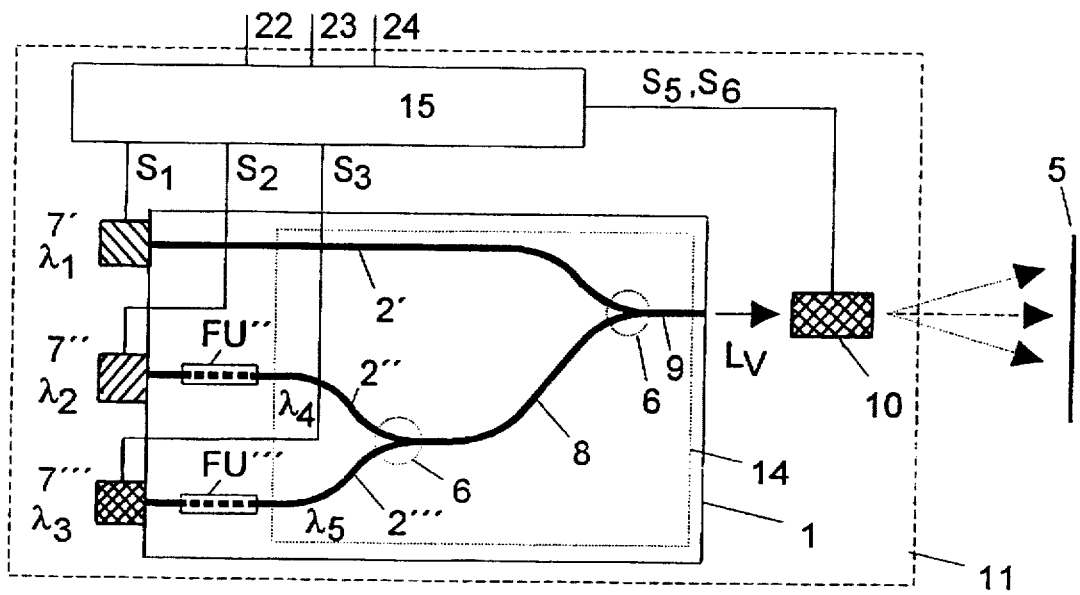
FIG. 21: Color image generation system by means of three light sources, frequency converters, and channel waveguide couplers.

FIG. 21 shows a color image generation system, where frequency converters FU, in this example quasi-phase matching elements, are located in the channel waveguides 2" and 2'".

It can be difficult to make suitable blue and green light available under the current state of the art if laser diodes are used as the light sources 7 for a color image generation system. It is however possible to exploit the principle of the generation of the second harmonic, if non-linearly optical active materials are used as substrate 1 (e.g. KTiOPO$_4$). The principle of quasi-phase matching may be used in KTiOPO$_4$, in order to generate light of the second harmonic from infrared pumping light, that is, green or blue light.

Phase harmonization between the pumping wave and the second harmonic must be achieved in this case. This is done by segmenting in a suitable fashion a section of the channel waveguide, to achieve a ferro-electrical domain reversal which is as efficient as possible. Pumping light of sufficient power is then capable of generating light of half the wavelength. The light of wavelength $\lambda_2$ becomes light of wavelength $\lambda_4$; light of wavelength $\lambda_3$ becomes light of wavelength $\lambda_5$. For example, the light source 7' emits red light of the wavelength $\lambda_1$=647 nm. Light source 7" emits, for example, light of wavelength $\lambda_2$=1064 nm, which is transformed to green light of wavelength $\lambda_4$=532 nm by the quasi-phase matching element FU".

Light source 7'" emits, for example, light of wavelength $\lambda_3$=830 nm, which is transformed to blue light of wavelength $\lambda_5$=415 nm by the quasi-phase matching element FU'". Following spatial combination of the light components at the output of the common wideband waveguide 9, intensity- or amplitude modulated, and color modulated (by the light sources) spatially combined light L$_{MV}$ is available for beam shaping and beam deflection.

Figure 22:
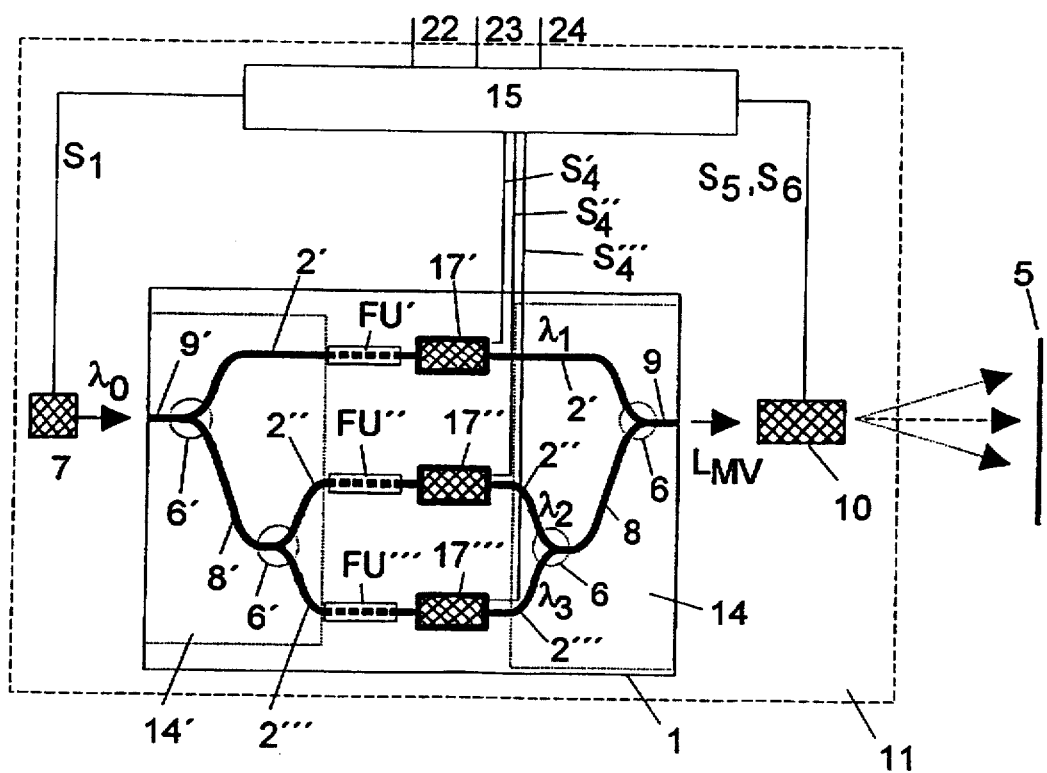
FIG. 22: Color image generation system by means of one light source and frequency converters.

FIG. 22 shows a color image generation system in which light of a wavelength $\lambda_0$ is injected into a channel waveguide 9'. The light is split up into three light components of the same wavelength $\lambda_0$ in the coupling points 6'. These light components are guided in each of the channel waveguides 2', 2", and 2'". A frequency converter element FU and then a modulation device 17 are mounted in each of the channel waveguides 2. The frequency converter elements FU are designed such that light of a different wavelength is generated from wavelength $\lambda_0$ in each element, for example light in the colors red, green and blue, which are each intensity- or amplitude modulated in the associated modulation device 17. The modulated light components of the wavelength $\lambda_1$, $\lambda_2$ and $\lambda_3$ are spatially combined in the passive coupling points 6 and are fed out at the light output of the common single-mode wideband channel waveguide 9 as intensity- or amplitude modulated, and color modulated, spatially combined light L$_{MV}$. The frequency converters FU operate according to the principles of the generation of higher harmonics as well as sum- and difference frequency generation (described in M. L. Sundheimer, A. Villeneuve, G. I. Stegemann and J. D. Bierlein "Simultaneous generation of red, green and blue light in a segmented KTP waveguide using a single source", Electronic letters, vol. 30 (1994), No. 12, pp 975–976).

Figure 23:
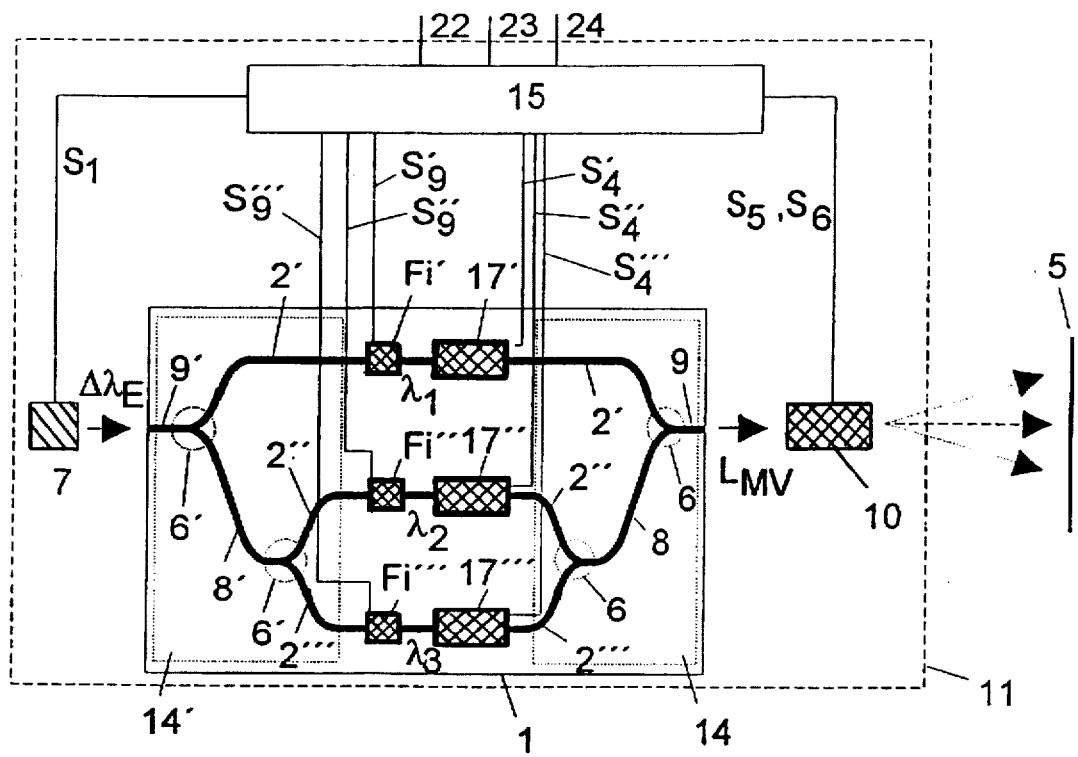
FIG. 23: Color image generation system using white light with color filters and wavelength-independent modulators.

FIG. 23 shows a color image generation system the light components of which being susceptible to modulation are generated by integrated color filters Fi from a wavelength range $\Delta\lambda_E$, in particular from white light.

Light from a light source 7 emits white light into the light input of a wideband channel waveguide 9'. The wideband channel waveguide 9' is split by coupling points 6' into the three wideband channel waveguides 2', 2", 2'". One color filter Fi', Fi" and Fi'" is fitted into each of these wideband channel waveguides which allows the light in the wavelengths $\lambda_1$, $\lambda_2$ and $\lambda_3$ or narrow-band wavelength ranges, e.g. the bandwidth 10 nm, which correspond to the colors red, green and blue to pass. If necessary, the filters Fi can be adjusted or controlled using the control signals S$_9$.

After the filters, only light components of one wavelength or of a narrow wavelength band are present in each of the wideband channel waveguides 2; these components can be modulated and spatially combined as described above. The intensity- or amplitude modulated, and color modulated, spatially combined light L$_{MV}$ is then passed to the unit for beam shaping and beam deflection 10 which projects the light onto a screen 5. The light components of an image spot generate the desired impression of color by means of additive color mixing.

Where a spectral lamp (e.g. a high pressure mercury vapour lamp) is used as the light source 7, the filters Fi in each single waveguide 2 need only be narrow-band to the extent that they only allow the desired line to pass.

Figure 24:
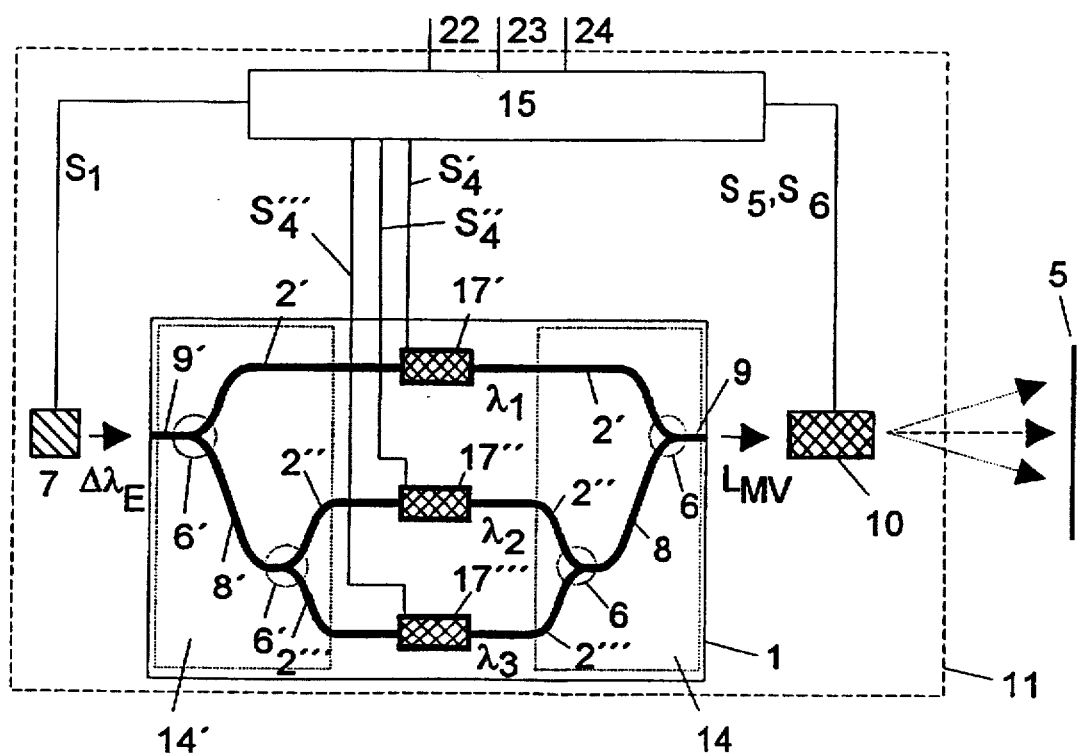
FIG. 24: Color image generation system using white light with wavelength-dependent modulators.

FIG. 24 shows a color image generation system which exploits the effect of filtering out certain light components of a wavelength range $\Delta\lambda_E$ from a broad wavelength spectrum, in particular from white light (subtractive color mixing).

The color image generation system uses a light source 7, emitting white light, which is injected into the wideband channel waveguide 9'. The white light is split into the wideband channel waveguides 2', 2", 2'" at the coupling points 6'.

Wavelength-selective intensity- or amplitude modulators 17 are mounted in the wideband channel waveguides 2', 2", 2'"; these filter out only a part of the spectrum because of the wavelength dependency of the electro-optical or other modulation modes as a function of the control signal S$_9$ applied. The rest consequently appears in the complementary color. The light components guided in the wideband channel waveguides 2', 2", 2'", which are filtered and intensity- or amplitude modulated, are spatially combined in the coupling points 6 and injected into the unit for beam shaping and beam deflection 10. This arrangement can be very easily achieved if the wavelength-selective intensity-or amplitude modulators 17 (e.g. taking the form of electro-optical Mach-Zehnder interferometer modulators) are dimensioned as appropriate. The mount 11 accommodates the white light source 7, the unit for the spatial combination of beams 14' (which here consists of the wideband waveguides 9', 8', 2', 2" and 2'" and additionally the coupling points 6' and which implements the beam splitting function), the wavelength-selective intensity- or amplitude modulators 17', 17" and 17'" on the wideband channel waveguides 2', 2", 2'", and additionally the unit for the spatial combination of beams 14 consisting of the wideband waveguides 2', 2", 2'", 8, 9 and the passive coupling points 6, and the unit for beam shaping and beam deflection 10.

Figure 25A:
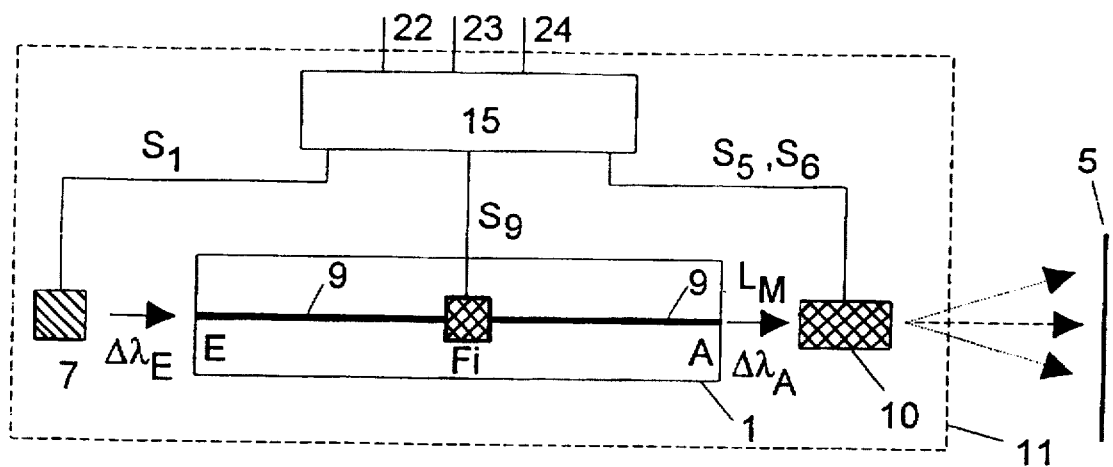
FIG. 25a–c: Color image generation systems with white light channel waveguides and color filters.
Figure 25B:
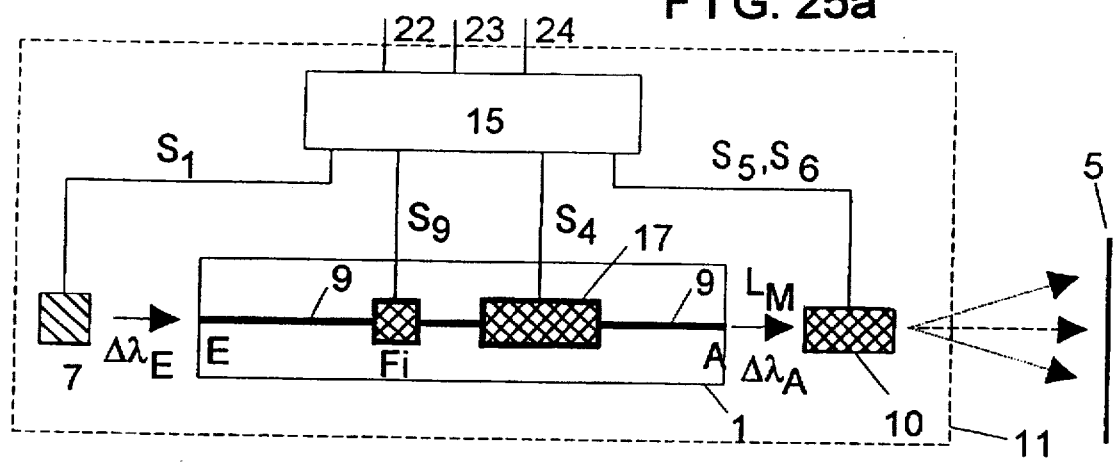
Figure 25C:
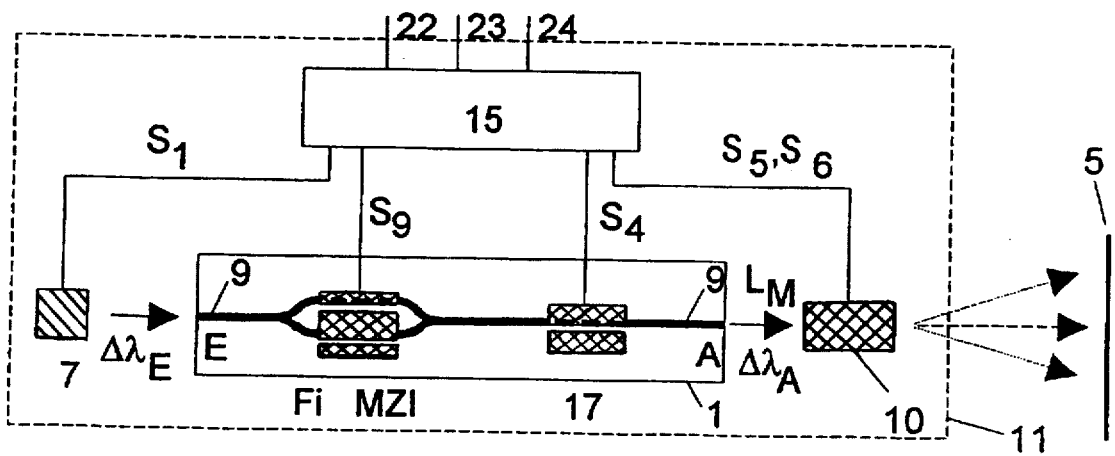

FIG. 25a–c show color image generation systems in which certain wavelength ranges $\Delta\lambda_E$ are filtered out of light of a broad wavelength range and color light points are projected to generate color images.

Since no color filter is known at present by means of which the color values necessary for a full color image reproduction may be set up, this solution may only be used for color images with subsidiary requirements on the quality of color reproduction.

A quality of color reproduction satisfying all requirements is achieved if the device is operated in time-multiplexed mode and three light components are superimposed to provide additive color mixing.

According to FIG. 25a, light of a wavelength spectrum $\Delta\lambda_E$, white light in the example, is injected into the wideband channel waveguide 9. A filter element Fi is mounted on the wideband channel waveguide 9. Specific wavelengths or wavelength ranges are filtered out of the wavelength spectrum $\Delta\lambda_E$ as a function of the control signal $S_9$ applied. Intensity- or amplitude modulation is achieved in the light source 7, or by means of another modulation device (not illustrated) between light source 7 and the color filter Fi. According to FIG. 25b, light of a wavelength spectrum $\Delta\lambda_E$, white light in the example, is injected into the wideband channel waveguide 9. A filter element Fi and an intensity- or amplitude modulation device 17 are mounted on the wideband channel waveguide 9. By means of filter element Fi, specific wavelengths or wavelength ranges are filtered out of the wavelength spectrum $\Delta\lambda_e$ as a function of the control signal $S_9$ applied.

In this case it is not necessary that the intensity- or amplitude modulation device 17 be wavelength selective.

Modulated light $L_M$ of a wavelength spectrum $\Delta\lambda_A$ is available at the light output of the wideband channel waveguide 9 for further processing by the unit for beam shaping and beam deflection 10.

FIG. 25c shows a concrete embodiment of the color image generation system described in FIG. 25b. SOWCW are used as wideband channel waveguides. An electro-optically controllable integrated-optical Mach-Zehnder interferometer structure MZI is used as the filter Fi; because of its wavelength-selective characteristics, this filters out a wavelength range which may be selected using control signal $S_9$ (control voltage). The transmitted light thus appears in the complementary color to the light component filtered out if the light source 7 emits white light. A cut-off modulator, which is electro-optically controllable by means of control signal $S_4$ (control voltage), is used as the intensity- or amplitude modulator 17. Intensity- or amplitude modulated, and color modulated light $L_M$ in the wavelength spectrum $\Delta\lambda_A$ is available at the light output of the single-mode wideband channel waveguide 9 for further processing.

In each of the examples shown in FIG. 25 the light is projected, by the unit for beam shaping and beam deflection 10, as an image spot of a color composition onto a screen 5 and perceived by the human eye 12.

The precondition for this is that the filter element is capable of selecting all desired color values by reason of its filter characteristics. Not all the color values required for a color image containing all color tones can be made available by a single filter element. The embodiment variants described under FIGS. 25a, 25b and 25c are completely adequate for providing a scope of color values that is restricted but is sufficient for many purposes (e.g. projection onto glass).

Additive color mixing of at least three color components is necessary to be able to reproduce all color values necessary for a high quality color image.

For this reason, at least three light pulses intended to form a color value are processed using the principle of time-multiplexed color spot generation (see description for FIG. 8). Light of a first color composition is projected to a point in a first period using the unit for beam shaping and beam deflection 10. Light of at least a second and a third color composition is projected to the same image spot in the subsequent periods. The minimum of three light components projected onto this point are the subject of physiological color mixing within the human eye.

FIG. 26 shows the known color image generation system as revealed in patent application DE 31 52 020 A1, which is generic. The system uses fiber optic tubes F for guiding the light beam. Each fiber optic tube F corresponds at the start end of the tube to a light source 7. The other ends of the tubes are fed to the unit for beam shaping and beam deflection 10 so that the exit faces of the tubes are tightly clustered in one plane.

Figure 27:
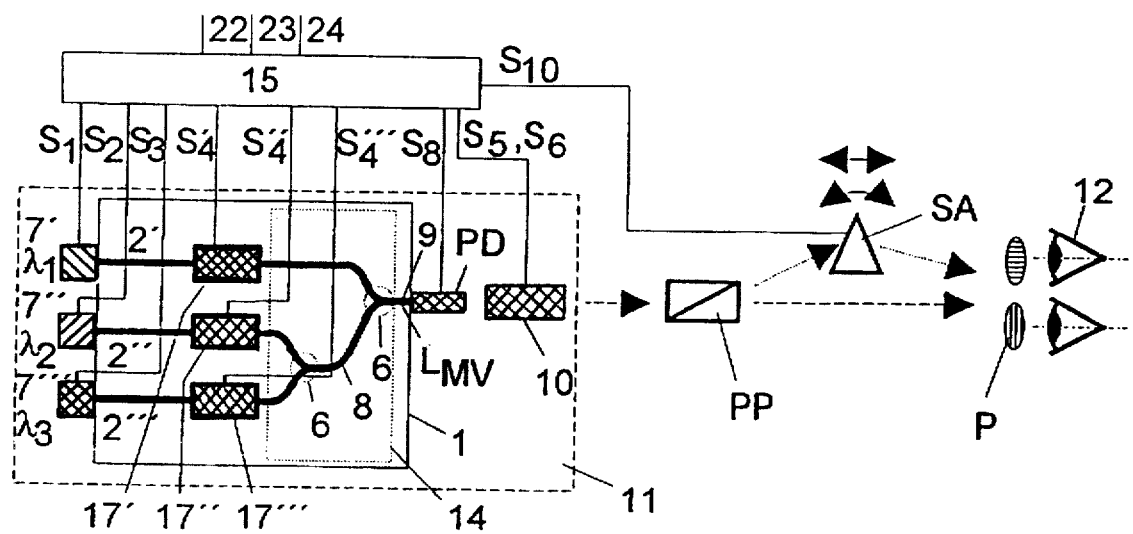
FIG. 27: Eyesight defect correction on a virtual image.

FIG. 27 shows a color image generation system for the generation of virtual images which provides the capability of determining and compensating for the eyesight defect known as squinting. Stereo image generation is achieved by means of the principle described in FIG. 18 by the generation of two images of differing polarization, which result in a stereo image when observed through polarizing spectacles. The two polarizations are separated in space by means of a polarization prism PP. The inclination of the optical axes of the two polarizations required to correct the eyesight defect is achieved by tilting the beam deflector SA (prism) by means of control signal $S_{10}$. It is possible to adjust the distance between the two optical axes by causing a linear shift of the beam deflector SA by means of control signal $S_{10}$. The polarization prism PP and beam deflector SA are located between the unit for beam shaping and beam deflection and the polarizers P. This arrangement opens up new medical and therapeutic applications.

Figure 28:
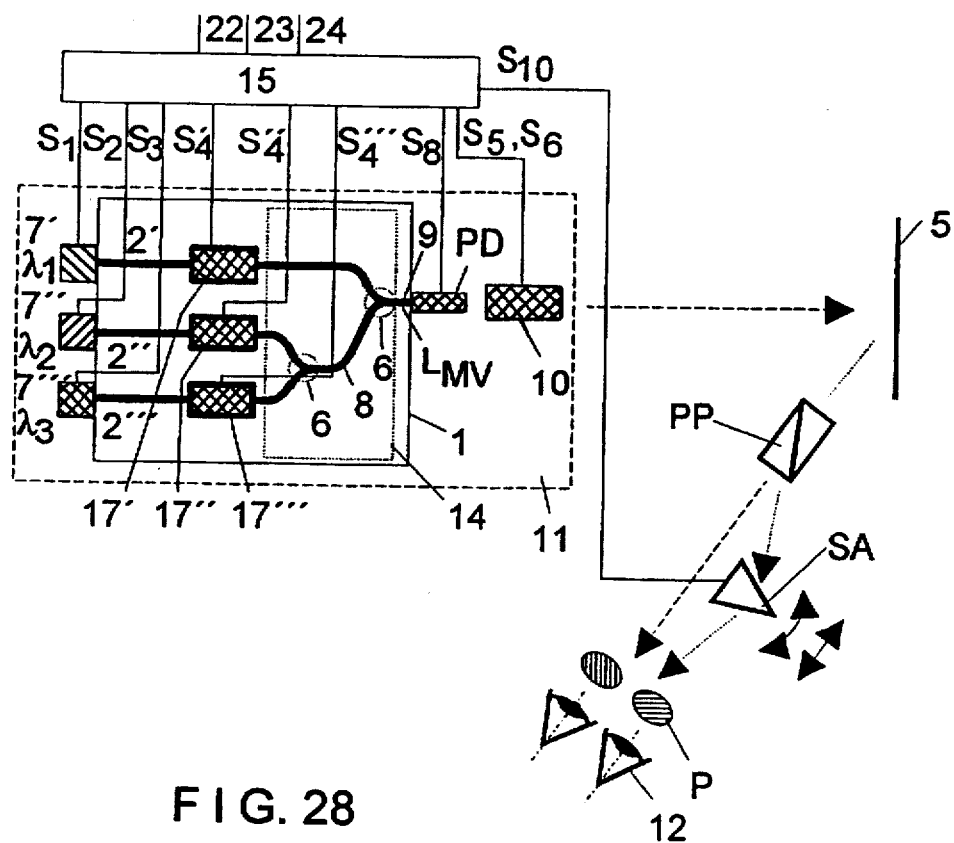
FIG. 28: Eyesight defect correction on a real image.

FIG. 28 shows a color image generation system for the generation of real images which provides the capability of determining and compensating for the eyesight defect known as squinting. Stereo image generation is achieved by means of the principle described in FIG. 18 by the generation of two images of differing polarization, which result in a stereo image when observed through polarizing spectacles. The two polarizations are separated in space by means of a polarization prism PP. The inclination of the optical axes of the two polarizations required to correct the eyesight defect is achieved by tilting the beam deflector SA (prism) by means of control signal $S_{10}$, it being possible to adjust the distance between the two optical axes by causing a linear shift of the beam deflector SA by means of control signal $S_{10}$. The polarization prism PP and beam deflector SA are located between the screen 5 and the polarizers P. This arrangement opens up new medical and therapeutic applications.

Figure 29:
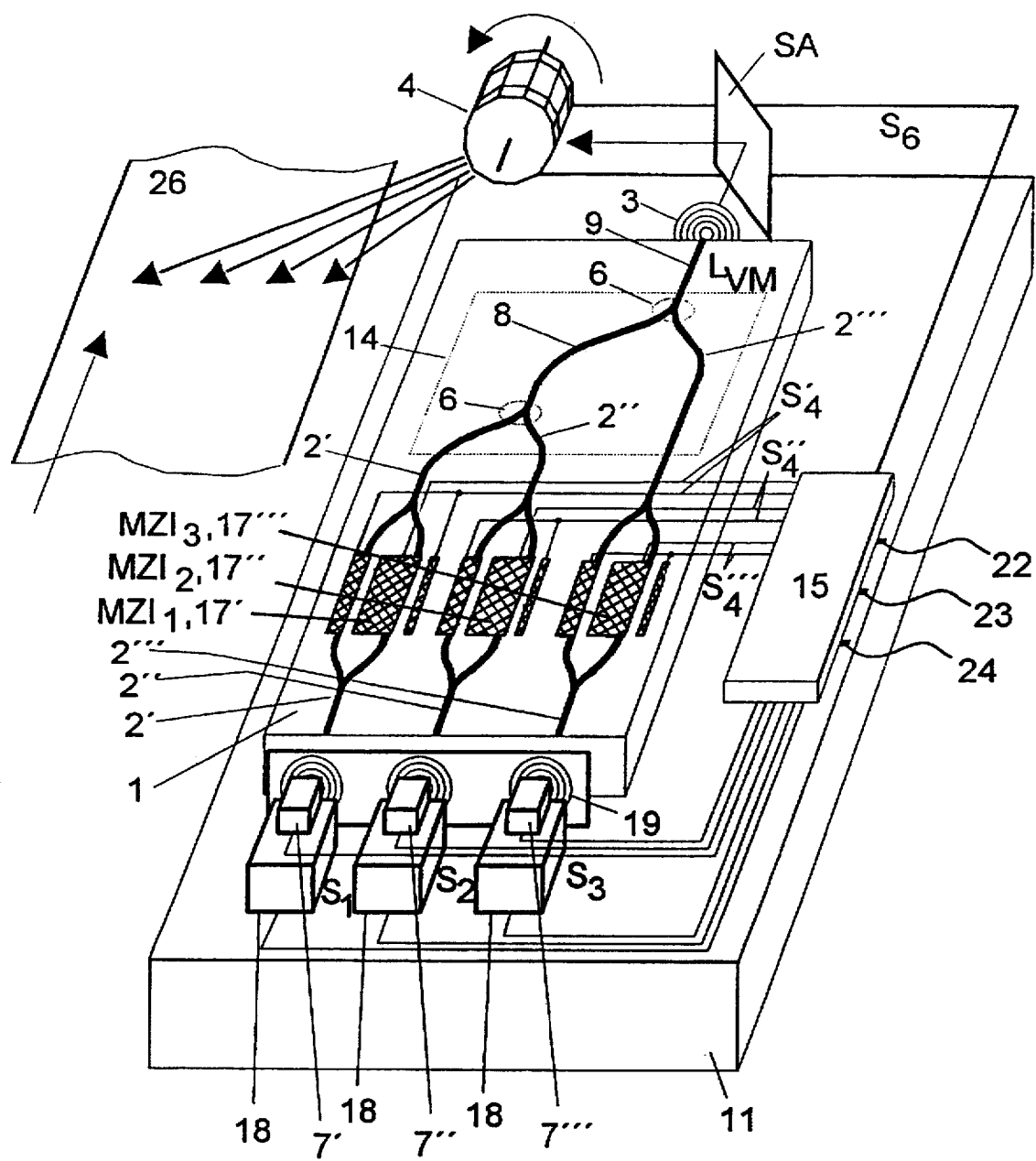
FIG. 29: Color printing system.

FIG. 29 shows a color mixing system for the purpose of color printing. Similar FIG. 9, the intensity- or amplitude modulated, and color modulated, light is fed out from waveguide 9 by means of a beam shaping device 3, and then directed to a beam deflection device 4—a polygonal mirror in this Figure—which beam deflection device, by means of its movement in synchronism with the color and intensity modulation, scans an image line on a photo-sensitive surface 26, thereby generating a color print line. The image is built up by means of the movement of the photo-sensitive surface 26 (paper) or the transfer of the lines written onto a movable photo-sensitive surface 26 to the printable medium (similar to a printing roller in laser printers). Alternatively, a two-dimensional deflection may be used to print to a non-moving photo-sensitive surface.

While the foregoing description and drawings represent the preferred embodiments of the present invention, it will be obvious to those skilled in the art that various changes and modifications may be made therein without departing from the true spirit and scope of the present invention.

Reference symbols

| | |
|---|---|
| 1 | Substrate, substrate material |
| 2 | Waveguide |
| 3 | Beam shaping device (optical system) |
| 4 | Beam deflecting device (deflecting mirror) |
| 5 | Screen |
| 6 | Passive coupling point |
| 7 | Light source |
| 8 | Waveguide |
| 9 | Waveguide, common waveguide |
| 10 | Beam shaping and beam deflecting unit |
| 11 | Mount; carrier |
| 12 | Human eye |
| 13 | Controllable coupling point |
| 14 | Unit for the spatial combination of beams |
| 15 | Control unit |
| 16 | Micro-optical lens |
| 17 | Modulation device (intensity or amplitude modulator) |
| 18 | Temperature stabilization device |
| 19 | Beam injection assembly (micro-optics assembly) |
| 20 | Casing |
| 21 | Light exit aperture |
| 22 | Power supply |
| 23 | Input for control signals |
| 24 | Input for operating signals regarding colour image parameters |
| 25 | Absorber |
| 26 | Photosensitive surface |
| 27 | Lens in the planar waveguide |
| A | Output |
| B | Blind output |
| x, y, z | Coordinates system |
| $\lambda, \lambda_0, \lambda_1, \lambda_2, \lambda_3, \lambda_4, \lambda_5$ | Wavelengths |
| $\Delta\lambda_B, \Delta\lambda_{B1}, \Delta\lambda_{B2}, \Delta\lambda_{B3}$ | Injected wavelength ranges |
| $\Delta\lambda_A$ | Wavelength range fed out |
| $E_1, E_2, E_3$ | Inputs |
| $A_1, A_2, A_3$ | Outputs |
| $S_1, S_2, S_3$ | Control signals for the light sources |
| $S_4$ | Control signal for the intensity- or amplitude modulation unit |
| $S_5$ | Control signal for beam shaping |
| $S_6$ | Control signal for beam deflection |
| $S_7$ | Control signal for controllable coupling points |
| $S_8$ | Control signal for polarization converter |
| $S_9$ | Control signal for colour filter |
| $S_{10}$ | Control signal for tiltable beam deflector (prism) |
| F | Optical fiber |
| PD | Polarization converter |
| P | Polarizer |
| AM | Intensity or amplitude modulator |
| MZI | Mach-Zehnder interferometer structure |
| $L_v$ | Spatially combined light |
| $L_M$ | Intensity- or amplitude modulated, and color modulated light |
| $L_{VM}$ | Spatially combined, intensity- or amplitude modulated, and color modulated light |
| $L_{MV}$ | Intensity- or amplitude modulated, and color modulated, spatially combined light |
| Fi | Color filter |

-continued

| | |
|---|---|
| FU | Frequency converter (quasi-phase matching element) |
| $BP_i$ | Image spots |
| PP | Polarization prism |
| SA | Beam deflector |

What is claimed:

1. A color image generation comprising:

at least one light source for emitting light of at least one wavelength or one wavelength range;

at least one optical waveguide responsive to said light emitted by said light source;

at least one controllable modulation device;

means for beam shaping and beam deflection;

one control unit being coupled to said at least one controllable modulation device for controlling at least one of intensity- or amplitude modulation and color modulation of said light as well as to said means for beam shaping and beam deflection;

said means for beam shaping and beam deflection by which said at least one of intensity- or amplitude modulated and color modulated light is adapted to being deflected in at least one spatial direction using said control unit in synchronism with modulation control, and an image field are adapted to being written to in digital fashion or in an analog fashion;

wherein, between said at least one light source and said means for beam shaping and beam deflection, a mount is arranged on which at least one optical waveguide is mounted such that a minimum of one optical waveguide capable of transmitting efficiently the wavelengths or wavelength ranges according to a predetermined application injects intensity- or amplitude modulated and/or color modulated light into said means for beam shaping and beam deflection.

2. The color image generation according to claim 1, where, to generate a full color image, a minimum of two independently controllable modulation devices for intensity- or amplitude modulation and color modulation of the writing light beam are located in at least one of the following:

in a minimum of one light source;

between the minimum of one light source and the mount with the minimum of one optical waveguide;

on the mount with the minimum of one optical waveguide; and between the mount with the minimum of one optical waveguide and the unit for beam shaping and beam deflection;

and where, from at least one modulation type selected from a group consisting of the following modulation types:

intensity- or amplitude modulation, phase modulation, polarization modulation in connection with a polarizer or a polarizing optical waveguide, and color modulation;

at least two of the modulation types being used at least once or at least one of the modulation types being used at least twice, for providing a variant selected from the group of the following variants:

intensity- or amplitude modulation in the minimum of two light sources, intensity- or amplitude modulation of at least one light source and color modulation in the minimum of one optical waveguide, color modulation of the light source, and intensity- or amplitude modulation in the minimum of one optical waveguide, intensity- or amplitude modulation in at least two optical waveguides, intensity- or amplitude modulation in at least one light source and in at least one optical waveguide connected to another light source, and color modulation of the light source, and intensity- or amplitude modulation in the optical waveguide are possible, and wherein control of the devices for intensity- or amplitude modulation and/or color modulation is effected by any signal, in particular a television signal, a video signal, an audio signal, a computer-generated signal, or the signal of a measurement device.

3. The color image generation system according to claim 1, comprising:
- at least two light sources by which the light components of different wavelengths or different wavelength ranges are adapted to be injected and efficiently transmitted into one optical waveguide belonging to one light source;
- a minimum of two optical waveguides, where a passive coupling point or a controllable coupling point is located at the outputs of the optical waveguides;
- said passive coupling point or said controllable coupling point being from which at least one optical waveguide is continued;
- the continuing optical waveguide being from whose output intensity- or amplitude modulated, and color modulated, spatially combined light may be fed out;
- with a minimum of three optical waveguides and said passive coupling point or said controllable coupling point providing a unit for the spatial combination of beams;
- and the light component of each wavelength or each wavelength range, as controlled by the control unit, being capable of being modulated independently from each other in a predetermined fashion; and
- wherein said means for beam shaping and beam deflection follows the continuing optical waveguide.

4. The color generation system according to claim 1, comprising:
- one light source whose light of several discrete wavelength or several discrete wavelength ranges, or a wavelength range adapted to being injected into an optical waveguide capable of efficiently transmitting the wavelengths or wavelength ranges according to an application, and adapted to being effectively transmitted in said optical waveguide; and
- said optical waveguide wherein the light may be intensity- or amplitude modulated, and/or color modulated, in an appropriate fashion as controlled by the control unit, and at the output of which waveguide intensity- or amplitude modulated and color modulated, light components may be fed out.

5. The color image generation system according to claim 1, where the minimum of one optical waveguide is a wideband waveguide, in particular a white light waveguide, and where said wideband waveguide is one selected from a group consisting of:
- an integrated-optical wideband channel waveguide, in particular a white light channel waveguide;
- a wideband optical fiber; and
- a wideband quasi-waveguide.

6. The color image generation system according to claim 1, wherein said mount includes a bracket for a minimum of one wideband optical fiber.

7. The color image generation system according to claim 1, wherein said mount includes a bracket for a substrate where a minimum of one integrated-optical wideband channel waveguide is generated.

8. The color image generation system according to claim 1, wherein said mount includes a bracket for a substrate where a minimum of one quasi-waveguide, is generated.

9. The color image generation system according to claim 3, including a unit for the spatial combination of beams which comprises a combination of at least one of optical fibers of the same or different types and channel waveguides and quasi-waveguides.

10. The color image generation system according to claim 3, including:
- three light sources, each emitting light of differing wavelengths or wavelength ranges to a unit for the spatial combination of beams;
- wherein the light is adapted to being injected into one input each of three waveguides;
- wherein the waveguides are combined at their outputs in at least one passive coupling point, or one controllable coupling point, with a further waveguide such that spatially combined light is adapted to being fed out at the output of the further waveguide, and further is passed to means for beam shaping and beam deflection and thus may be projected into space;
- wherein the light components of each wavelength, or each wavelength range capable of being modulated independently of each other; and
- wherein the beam shaping and beam deflection of the spatially combined light is achieved in at least one dimension of space synchronously with the control of the modulation for the corresponding light components of the three light sources.

11. The color image generation system according to claim 10, wherein the three light components, which individually are adapted to being injected into one waveguide, correspond to a color system with basic colors red, green and blue.

12. The color image generation system according to claim 1, wherein light components of the minimum of two wavelengths or wavelength ranges may each be injected as light pulses sequentially into one waveguide and can be spatially superimposed in the passive coupling point or in the controllable coupling point, and wherein the spatially combined light components can be controlled in the common waveguide by a modulation device in a pulsed cycle.

13. The color image generation system according to claim 4, wherein a device for intensity- or amplitude modulation and/or color modulation is arranged in the course of waveguide, and where the device for color modulation is a controllable filter, and the modulation device is coupled to said control unit, and the modulation of the intensity or amplitude of the light is achieved by a controllable light source.

14. The color image generation system according to claim 4, wherein a device for intensity- or amplitude modulation and/or color modulation is arranged in the course of waveguide, and where the device for color modulation is a controllable filter, and the modulation device is coupled to said control unit, and the modulation of the intensity or amplitude of the light is achieved by an intensity- or amplitude modulator arranged in the waveguide before or after the filter.

15. The color image generation system according to claim 4, wherein the color values of a mixed color are capable of being generated by spatial superimposition of individual image spots in time-multiplexed operation.

16. The color image generation system according to claim 4, wherein a color value of each image spot is directly set through the filter.

17. The color image generation system according to claim 4, wherein a waveguide is split at least once at a minimum of one passive coupling point, and light components of the same wavelength or of the same wavelength ranges is guided in each waveguide;

- a filter and an intensity- or amplitude modulator are arranged as needed in each waveguide;
- the light components guided in the waveguides are spatially combined in at least a further passive coupling point in a common waveguide;
- and the intensity- or amplitude modulated, and color modulated, spatially combined light may be fed out at the output of the common waveguide.

18. The color image generation system according to claim 1, wherein either light of a wavelength may be injected into the waveguide, split into one or several passive coupling points and the light components guided in each waveguide, or light of at least two wavelengths may be injected into at least two waveguides, where in at least one of the waveguides a frequency converter is located by which higher harmonics of the basic frequency, sum or difference frequencies of the light may be generated, based on non-linear optical effects, and an intensity- or amplitude modulator is arranged as needed, and the light components guided in waveguides are spatially combined in at least a further passive coupling point in a common waveguide, and wherein the system is adapted to feed out the intensity- or amplitude modulated, and color modulated, spatially combined light at the output of the common waveguide.

19. The color image generation system according to claim 5, wherein the waveguides, such as the wideband and white light waveguides, are single-mode.

20. The color image generation system according to claim 5, wherein the waveguides, such as the wideband and white light waveguides, are single-mode integrated-optical wideband channel waveguide.

21. The color image generation system according to claim 1, wherein, for the purposes of generating a real image, said means for beam shaping and beam deflection is capable of projecting intensity- or amplitude modulated, or color modulated, light as an image line or an image onto a photo-sensitive surface.

22. The color image generation system according to claim 1, wherein the construction of the individual assemblies, including said control unit;
said at least one light source;
said minimum of one waveguide, said minimum of one modulation device for the light; and
said means for beam shaping and beam deflection is achieved by a technique selected from the group consisting of:
 a) discrete construction;
 b) several or all of these assemblies being implemented monolithically on a substrate material;
 c) in a hybrid fashion, on the basis of several substrate materials; and
 d) integrated as a module, the assemblies being enclosed in a casing with a light exit aperture, and with the control unit being contained in the module with electrical connections for the power supply, for the control signal, and for operating signals with respect to the color image parameters.

23. The color image generation system according to claim 1, in which one of a micro-lens, or an injection grating, or a conventional optical system, or a prism injection system, or an optical fiber, acting as an injection device are arranged between the minimum of one light source and the minimum of one waveguide.

24. The color image generation system according to claim 1, wherein, for the purposes of increasing the light transmission performance, several waveguides and the associated inputs and outputs as well as any intensity- or amplitude modulators and/or color modulators are connected in parallel.

25. The color image generation system according to claim 1, wherein, for the purposes of increasing the extinction ratio of the intensity- or amplitude modulation, and/or color modulation, the intensity- or amplitude modulators and/or color modulators are connected in series.

* * * * *